(12) United States Patent  
Smith et al.

(10) Patent No.: US 10,708,575 B2  
(45) Date of Patent: Jul. 7, 2020

(54) DISPLAY SYSTEM WITH DIFFUSE AND SPECULAR REFLECTIVE MODES

(71) Applicant: Sharp Kabushiki Kaisha, Osaka (JP)

(72) Inventors: Nathan James Smith, Oxford (GB); Paul Antony Gass, Oxford (GB)

(73) Assignee: SHARP KABUSHIKI KAISHA, Osaka (JP)

( * ) Notice: Subject to any disclaimer, the term of this patent is extended or adjusted under 35 U.S.C. 154(b) by 94 days.

(21) Appl. No.: 14/524,446

(22) Filed: Oct. 27, 2014

(65) Prior Publication Data

US 2015/0042704 A1 Feb. 12, 2015

Related U.S. Application Data

(63) Continuation-in-part of application No. 13/532,154, filed on Jun. 25, 2012, now Pat. No. 9,679,506.

(51) Int. Cl.
*G09G 3/36* (2006.01)  
*H04N 13/302* (2018.01)  
(Continued)

(52) U.S. Cl.
CPC ........... *H04N 13/302* (2018.05); *G09G 3/003* (2013.01); *G09G 3/3208* (2013.01);  
(Continued)

(58) Field of Classification Search
None  
See application file for complete search history.

(56) References Cited

U.S. PATENT DOCUMENTS 4,840,463 A 6/1989 Clark et al.  
4,958,916 A 9/1990 Clark et al.  
(Continued)

FOREIGN PATENT DOCUMENTS

CN 1189224 7/1998  
CN 102016961 4/2011  
(Continued)

OTHER PUBLICATIONS

Final Office Action for co-pending U.S. Appl. No. 13/532,154, dated Aug. 26, 2015.  
(Continued)

*Primary Examiner* — William Boddie  
*Assistant Examiner* — Alecia D English  
(74) *Attorney, Agent, or Firm* — Renner, Otto, Boisselle & Sklar, LLP

(57) ABSTRACT

A display system which includes a first image display; a second image display; a reflective polariser disposed between the first image display and the second image display, with the second image display disposed on a viewing side of the display system; and a controller for addressing image data to the first image display and the second image display, wherein the controller, the first image display and second image display are configured to selectively operate in accordance with: a first display function in which the first image display is visible to a viewer through the second image display and the second image display appears substantially transparent to the first image display; a second display function in which the display system is in a reflective mode that conveys information to a user; and a third display function in which images are addressed to both the first image display and the second image display. The second display function may be generated by utilizing a diffusively reflective element such that the display system appears as a patterned diffuse reflection to the view.

20 Claims, 25 Drawing Sheets

(51) Int. Cl.
*G09G 3/3208* (2016.01)
*G09G 3/00* (2006.01)
*G09G 3/34* (2006.01)

(52) U.S. Cl.
CPC ............ *G09G 3/3406* (2013.01); *G09G 3/36* (2013.01); *G09G 3/3611* (2013.01); *G09G 2300/023* (2013.01); *G09G 2300/0426* (2013.01); *G09G 2320/028* (2013.01)

(56) References Cited

U.S. PATENT DOCUMENTS

| | | | |
|---|---|---|---|
| 5,686,979 A * | 11/1997 | Weber | E06B 9/24 349/96 |
| 6,249,332 B1 | 6/2001 | Bryan-Brown et al. | |
| 6,373,457 B1 | 4/2002 | Kim et al. | |
| 6,445,434 B2 | 9/2002 | Takato et al. | |
| 6,646,697 B1 | 11/2003 | Sekiguchi et al. | |
| 6,992,741 B2 | 1/2006 | Kitson et al. | |
| 7,019,795 B2 | 3/2006 | Jones | |
| 7,375,784 B2 | 5/2008 | Smith et al. | |
| 7,495,719 B2 | 2/2009 | Adachi et al. | |
| 7,813,042 B2 | 10/2010 | Mather et al. | |
| 2003/0043313 A1 | 3/2003 | Minoura | |
| 2004/0085660 A1 | 5/2004 | Hara | |
| 2004/0165135 A1* | 8/2004 | Jones | G02F 1/133753 349/142 |
| 2005/0030158 A1 | 2/2005 | Schulmerich et al. | |
| 2005/0195344 A1 | 9/2005 | Chang et al. | |
| 2005/0270463 A1 | 12/2005 | Akahane et al. | |
| 2006/0023146 A1 | 2/2006 | Yang et al. | |
| 2006/0082699 A1 | 4/2006 | Ghelsen et al. | |
| 2006/0202942 A1 | 9/2006 | Fong | |
| 2006/0262258 A1* | 11/2006 | Wang | G02F 1/133555 349/117 |
| 2007/0058257 A1* | 3/2007 | Lynam | B60Q 1/2665 359/604 |
| 2007/0097504 A1 | 5/2007 | Li et al. | |
| 2007/0242028 A1 | 10/2007 | Kitagawa et al. | |
| 2007/0296911 A1 | 12/2007 | Hong | |
| 2008/0002432 A1* | 1/2008 | Ueno | G02B 6/0028 362/620 |
| 2008/0198294 A1 | 8/2008 | Hwang et al. | |
| 2008/0232080 A1 | 9/2008 | Lamberth et al. | |
| 2008/0273145 A1 | 11/2008 | Akiyama | |
| 2009/0058787 A1 | 3/2009 | Weng et al. | |
| 2009/0310071 A1* | 12/2009 | Hwang | G02F 1/133504 349/114 |
| 2011/0122329 A1 | 5/2011 | Broughton et al. | |
| 2011/0267317 A1 | 11/2011 | Tsuda | |
| 2013/0148044 A1 | 6/2013 | Ohyama et al. | |
| 2014/0049734 A1 | 2/2014 | Erinjippurath | |

FOREIGN PATENT DOCUMENTS

| | | |
|---|---|---|
| EP | 0 933 633 A1 | 8/1999 |
| EP | 0933663 A1 | 8/1999 |
| GB | 2457692 | 8/2009 |
| GB | 1103815.5 | 3/2011 |
| JP | 3419766 | 6/2003 |
| JP | 2007/127724 | 5/2007 |
| JP | 2010/20211 | 1/2010 |
| WO | WO 98/54616 | 12/1998 |
| WO | WO 2007/126148 | 11/2007 |
| WO | WO 2014002402 A1 | 1/2014 |

OTHER PUBLICATIONS

Yamamoto et al., "Optimum Parameteres and Viewing Areas of Stereoscopic Full-Color LED Display Using Parallax Barrier", IEICE Trans Electron, vol. E83-C, No. 10, Oct. 2000 (cited on p. 2, line 16 of the specification).

Takagi et al., "30.3: Autostereoscopic Partial 2-D/3-D Switchable Display Using Liquid-Crystal Gradient Index Lens", SID Digest 2010, pp. 436, ISSN 0097966X/10/4101-0436.

Bryan-Brown et al., "Grating Aligned Bistable Nematic Device", Proc. SID XXVIII 5.3, pp. 37-40 (1997) (cited on p. 3 line 23 of the specification).

Yeh et al., "Optics of Liquid Crystal Displays", Wiley 1999, pp. 194-213 (cited on p. 4, line 2 of the specification).

Xie et al., "0°-360° bistable nematic liquid crystal display with large dΔn and high constrast", Journal of Applied Physics, vol. 88, No. 4, p. 1722, Aug. 15, 2000 (cited on p. 4, line 7 of the specification).

Office Action for co-pending U.S. Appl. No. 13/532,154, dated Feb. 13, 2015.

Co-pending U.S. Appl. No. 13/532,154, filed Jun. 25, 2012 (current claims provided).

Co-pending U.S. Appl. No. 14/524,467, filed Oct. 27, 2014 (application provided).

Office Action for related U.S. Appl. No. 14/524,467, dated Mar. 28, 2016.

Final Office Action for related U.S. Appl. No. 13/532,154, dated Jul. 15, 2016.

Office Action for co-pending U.S. Appl. No. 13/532,154, dated Jan. 15, 2016.

Final Office Action for related U.S. Appl. No. 14/524,467, dated Oct. 6, 2016.

Office Action for related U.S. Appl. No. 13/532,154, dated Dec. 29, 2016.

Office Action for related U.S. Appl. No. 14/524,467, dated May 18, 2017.

Office Action for related U.S. Appl. No. 14/524,467, dated Jan. 11, 2018.

Advisory Action for related U.S. Appl. No. 14/524,467, dated May 14, 2018.

Examiner's Answer for related U.S. Appl. No. 14/524,467, dated Oct. 19, 2018.

Notice of Decision from Post-Prosecution Pilot Program(P3) Conference for related U.S. Appl. No. 13/532,154 dated Oct. 14, 2016.

* cited by examiner

Figure 2: Conventional Art

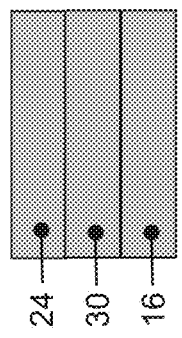
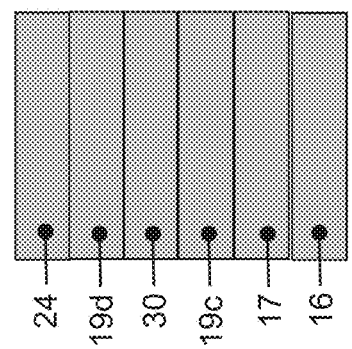
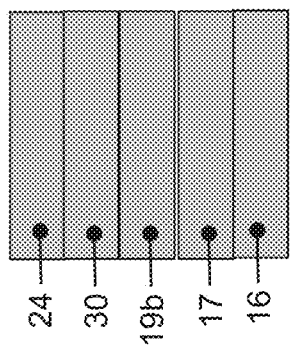
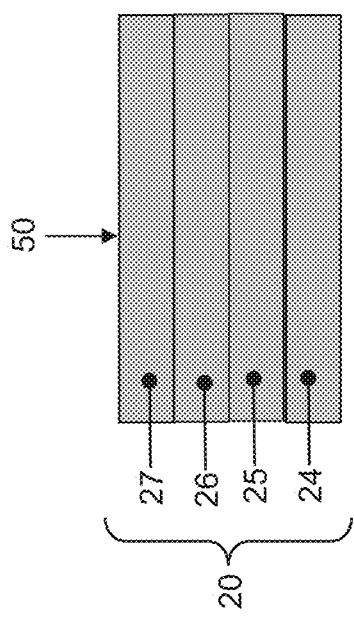
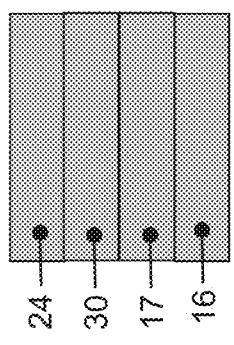
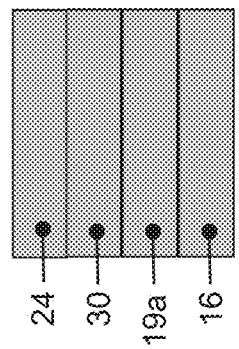

Figure 21:

| Function | First Display 10 | Second Display 20 | Backlight (if applicable) |
|---|---|---|---|
| 1st | Image | Transparent (first state) - uniform | On/Off |
| 2nd | Inactive | Mirror (second state) - uniform | Off |
| 3rd | Inactive | Patterned Mirror image (first/second state) | Off |
| 4th | Image | Patterned Mirror image (first/second state) | On/Off |
| 5th | 3D Image | Parallax Optic | On/Off |
| 6th | Image | Obscuring Optic | On/Off |

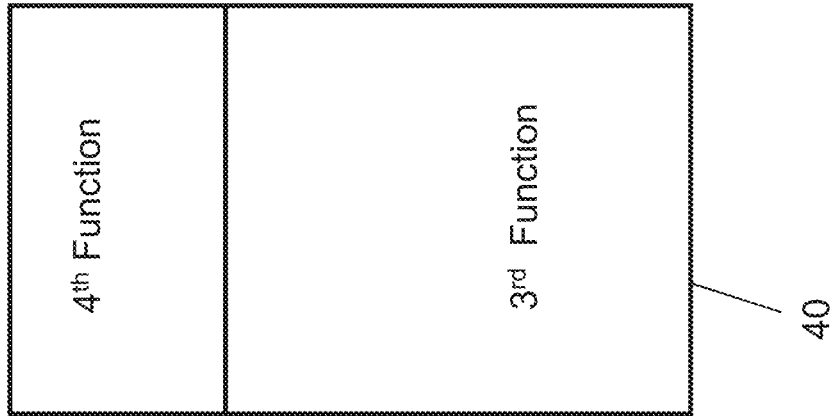
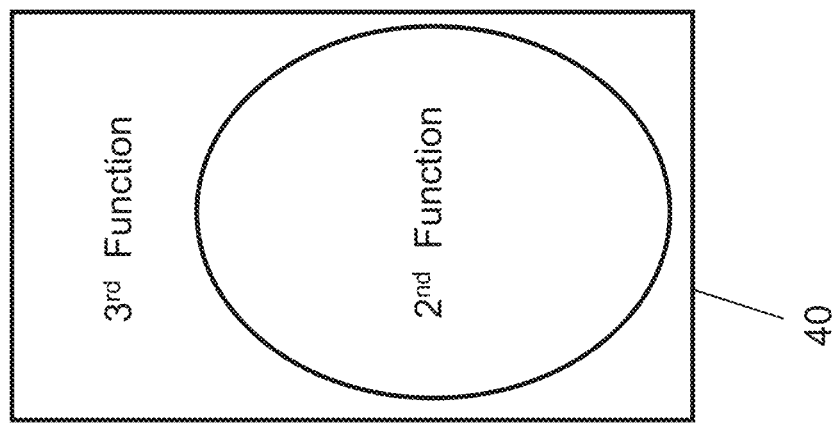
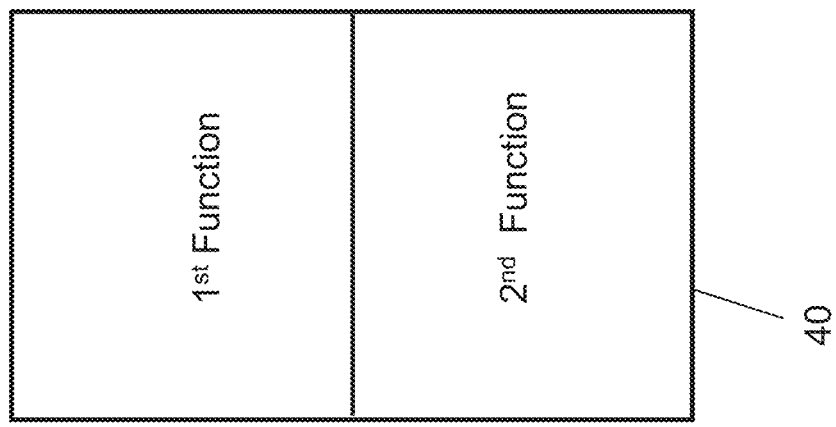

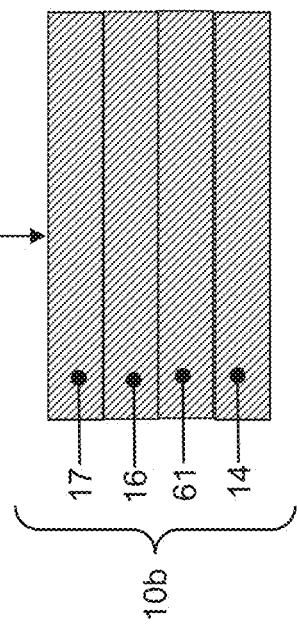
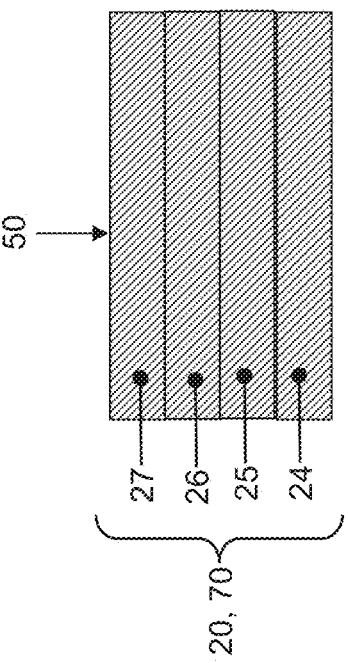
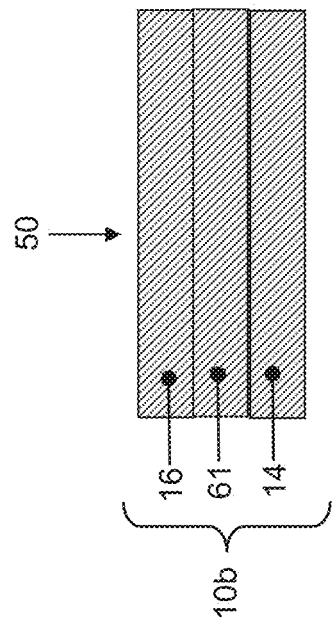
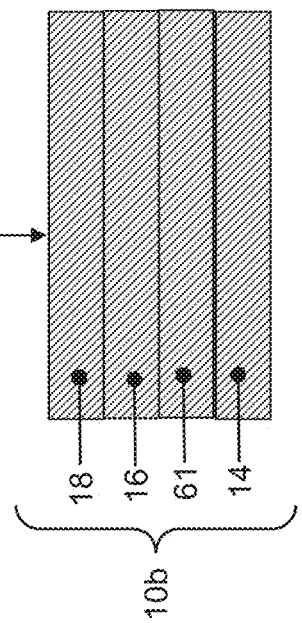

DISPLAY SYSTEM WITH DIFFUSE AND SPECULAR REFLECTIVE MODES

RELATED APPLICATION DATA

This application is a continuation-in-part of U.S. application Ser. No. 13/532,154 filed on Jun. 25, 2012, the contents of which is incorporated here in its entirety by reference.

TECHNICAL FIELD

This invention relates to a display system that has two displays that has multiple display modes including a substantially low power consumption reflective display mode.

BACKGROUND ART

Switchable mirror display patents EP0933663B1 (Sekiguchi et al.; 4 Aug. 1999) and JP3419766 (Adachi et al.; 16 Nov. 2001) describe the use of reflective polariser films (e.g., dual brightness enhancement films, or "DBEFs") sandwiched between a first and second image display. These display devices can be electrically switched between a normal image display mode and a mirror mode whereby ambient light is reflected from the DBEF to produce a mirror mode.

U.S. Pat. No. 7,495,719B2 (Adachi et al.; 24 Feb. 2009) describes a display device capable of being electrically switchable between a state that displays a high-quality image (normal mode) and a mirror mode. The mirror mode produces an easy-to-view reflection image suitable for a person to view his/her own face or figure. With reference to FIG. 1 of Adachi, the display device has an image display portion 1000, a reflective polarization selection member 300, a transmission polarization axis variable portion 400, and an absorbing polarization selection member 500, which are successively disposed. The image display portion 1000 includes an absorbing polarization selection member 208 that transmits a linear polarization component of a predetermined direction and absorbs a linear polarization component of a direction orthogonal thereto, and the absorbing polarization selection member 208 is disposed at the reflective polarization selection member 300 side. U.S. Pat. No. 5,686,979 (Weber et al.; 11 Nov. 2011) describes the use of a standard backlight, a reflective polariser film (DBEF), a first simple switchable liquid crystal (LC) panel and a second liquid crystal display (LCD) capable of showing images. These components are assembled to yield a display system that can be switched between a transmissive display mode that utilises the backlight and a reflective display mode that does not use the backlight. A reflective LCD is particularly useful for viewing images in high ambient lighting conditions.

U.S. Pat. No. 5,686,979 also describes the use of reflective polariser films (DBEFs) and a single image display to yield a display system capable of conveying text and monochrome pictures.

WO2014002402A1 (Smith et al.; 3 Jan. 2014) describes the use of reflective polariser films (DBEF) sandwiched between a first and second image display. The display system is capable of multiple image functions.

The design and operation of parallax barrier technology for viewing 3D images is well described in a paper from the University of Tokushima Japan ("Optimum parameters and viewing areas of stereoscopic full colour LED display using parallax barrier", Hirotsugu Yamamoto et al., IEICE trans electron, vol. E83-c no 10 Oct. 2000).

FIG. 1 shows the basic design and operation of parallax barrier technology for use in conjunction with an image display for creating a 3D display. The images for the left eye and right eye are interlaced on alternate columns of pixels of the image display. The slits in the parallax barrier allow the viewer to see only left image pixels from the position of their left eye and right image pixels from the position of their right eye.

The same autostereoscopic 3D effect as shown in FIG. 1 can be achieved by using lenticular lenses. Each lens is substantially equivalent to a parallax barrier slit. FIG. 2 shows a conventional 3D system comprised of lenticular lenses and an image display.

The technologies illustrated in FIG. 1 and FIG. 2 can be configured to provide a high quality 3D mode. However, many applications exist whereby a display is also required to operate in a high quality 2D mode. Using the technologies illustrated in FIG. 1 and FIG. 2 would yield a 2D image with half the native resolution of the image display—this is highly undesirable. For the image display to show an image with 100% native resolution in the 2D mode, the parallax optics (parallax barrier, lenticular etc.) must be switchable between a first mode that provides substantially no imaging function (2D mode) to a second mode of operation that provides an imaging function (3D mode).

An example of a switchable parallax barrier technology is disclosed in U.S. Pat. No. 7,813,042B2 (Mather et al.; 12 Oct. 2010). However, switchable parallax barrier technology has the disadvantage that the parallax barrier absorbs light in the 3D mode, reducing transmission by ~65%. This inefficient light usage is a disadvantage since the 2D mode and 3D mode will have a significantly different brightness. Boosting the brightness of the 3D mode can be achieved at the expense of increased power consumption, which is undesirable, especially for mobile products.

A liquid crystal graded refractive index lens (LC GRIN lens) is a switchable lens that uses conventional liquid crystal display (LCD) manufacturing processes. 3D display systems that use LC GRIN lenses have been disclosed by US2007296911A1 (Hong; 27 Dec. 2007), U.S. Pat. No. 7,375,784 (Smith et al.; 20 May 2008) and "30.3 Autostereoscopic Partial 2-D/3-D Switchable Display" by Takagi et al (SID DIGEST 2010 pp 436).

A further example of an optical element that provides a high quality 2D mode and a high quality 3D mode is disclosed in GB1103815.5 (Smith et al; filed GB 7 Mar. 2011). To enable the 3D mode, the optical element disclosed in GB1103815.5 includes an array of GRIN lenses, with each GRIN lens separated from the next by a region of parallax barrier.

Bistable Liquid Crystal Displays are described by Bryan-Brown et al. "Grating Aligned Bistable Nematic Device", Proc SID XXVIII 5.3, pp 37-40 (1997) and patents U.S. Pat. No. 6,249,332 (Bryan-Brown et al.; 19 Jun. 2001), U.S. Pat. No. 7,019,795 (Jones; 28 Mar. 2006) and U.S. Pat. No. 6,992,741 (Kitson et al, 21 May 2002). A bistable LCD has two energetically stable configurations of the liquid crystal molecules. Power is only required to switch from a first energetically stable state to the second energetically stable state. Consequently, a bistable LCD can be passively addressed with a first image and power is only required to display a second image that is different from the first image. A bistable LC mode may be combined with optical components to enable a reflective bistable LCD. A reflective bistable LCD is particularly useful for viewing images in high ambient lighting conditions. A reflective bistable LCD is particularly useful for display applications requiring very low power consumption.

The principle and operation of Supertwisted Nematic (STN) Displays have been fully described by many different sources, including "Optics of Liquid Crystal Displays" pp. 194 by Yeh and Gu (Wiley, 1999). Supertwisted Nematic Displays employ a liquid crystal mode that can be passively addressed in order to yield an image.

The principle and operation of Bistable Twisted Nematic (BTN) Displays have been fully described by many different sources. A review of the BTN LC mode is described in "0°-360° bistable nematic liquid crystal display with large dΔn" by X. L. Xie et al, Journal of Applied Physics, Vol. 88, No. 4, p. 1722. Bistable Twisted Nematic Displays employ a liquid crystal mode that can be passively addressed in order to yield an image.

The principle and operation of Ferroelectric Liquid Crystal Displays (FLC) have been fully described by many different sources including U.S. Pat. No. 4,840,463 (Clark et al.; 20 Jun. 1989) and U.S. Pat. No. 4,958,916 (Clark et al.; 25 Sep. 1990). Ferroelectric Liquid Crystal Displays employ a liquid crystal mode that can be passively addressed in order to yield an image.

U.S. Pat. No. 6,445,434 describes the use of an additional liquid crystal layer to enable switching between a wide angle public viewing mode and a narrow angle private viewing mode.

SUMMARY OF INVENTION

According to an aspect, a display system is provided which includes a first image display; a second image display; a reflective polariser disposed between the first image display and the second image display, with the second image display disposed on a viewing side of the display system; and a controller for addressing image data to the first image display and the second image display, wherein the controller, the first image display and second image display are configured to selectively operate in accordance with: a first display function in which the first image display is visible to a viewer through the second image display and the second image display appears substantially transparent to the first image display; a second display function in which the display system is in a reflective mode that conveys information to a user; and a third display function in which images are addressed to both the first image display and the second image display. The second display function may be generated by utilizing a diffusively reflective element such that the display system appears as a patterned diffuse reflection to the viewer.

According to another aspect, a display system is provided which includes a first image display; a second image display; a reflective polariser disposed between the first image display and the second image display, with the second image display disposed on a viewing side of the display system; and a controller for addressing image data to the first image display and the second image display, wherein the controller, the first image display and second image display are configured to selectively operate in accordance with: a first display function in which the first image display is visible to a viewer through the second image display and the second image display appears substantially transparent to the first image display; a second display function in which the display system appears as a plane mirror to the viewer; and a third display function in which the display system appears as a patterned mirror to the viewer.

According to another aspect of the invention, a display system is provided that includes from the viewing side: a second image display, an optical diffuser, a reflective polariser, and a first image display. The first image display may be any suitable display, such as for example, a liquid crystal display (LCD) or organic light emitting diode (OLED), and is capable of displaying high resolution, full colour images. The second image display is a liquid crystal display. The second image display does not contain opaque Thin Film Transistors (TFT), and an image is displayed on the second image display via a passive addressing scheme (Duty-type driving) or a further addressing scheme that does not employ the use of opaque transistors or any other substantially opaque features. The second image display does not contain colour filters or any features that would provide a substantial, non-switchable parallax effect or substantial Moiré effect between the first and second image displays. The second image display is used in conjunction with the first image display to yield a display system that has multiple image displays functions, including a low power display mode with excellent sunlight readability.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIG. 7: A second image display, side view

FIG. 8a: A combination of polarising elements and reflective polariser

FIG. 8b: A combination of polarising elements and reflective polariser

FIG. 8c: A combination of polarising elements and reflective polariser

FIG. 8d: A combination of polarising elements and reflective polariser

FIG. 8e: A combination of polarising elements and reflective polariser

FIG. 21 is a table representing control of the first image display, second image display and backlight (if applicable)

FIG. 22a: simultaneous employment of multiple display functions

FIG. 22b: simultaneous employment of multiple display functions

FIG. 22c: simultaneous employment of multiple display functions

FIG. 27: Alternative embodiment of organic light emitting type first image display, side view FIG. 28: Additional alternative embodiment of organic light emitting type first image display, side view FIG. 29: Additional alternative embodiment of organic light emitting type first image display, side view FIG. 30: Alternative embodiment of second image display, side view

DESCRIPTION OF REFERENCE LABELS

Figure 1:
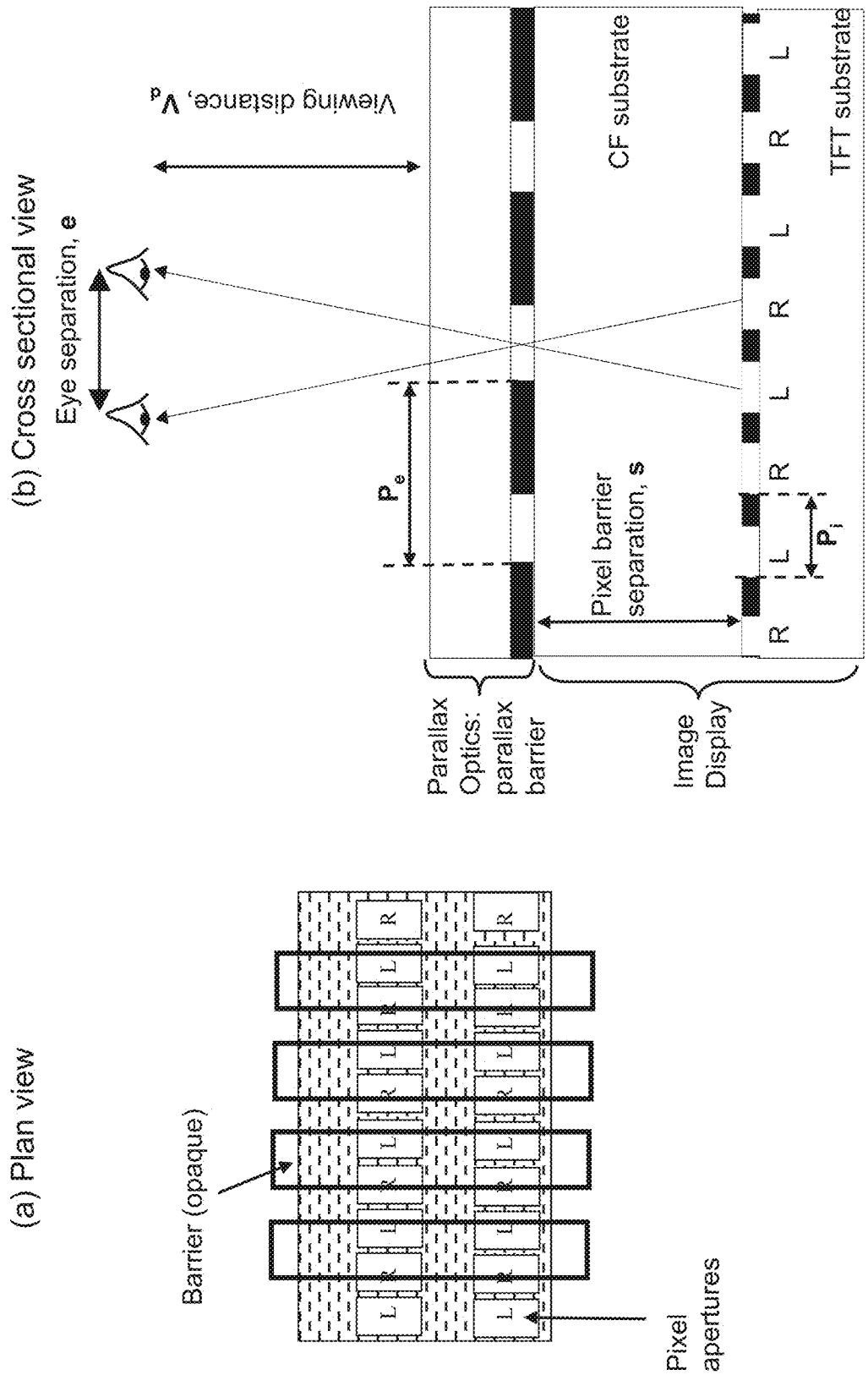
FIG. 1: A conventional design and operation of a parallax barrier technology for creating a 3D display
Figure 2:
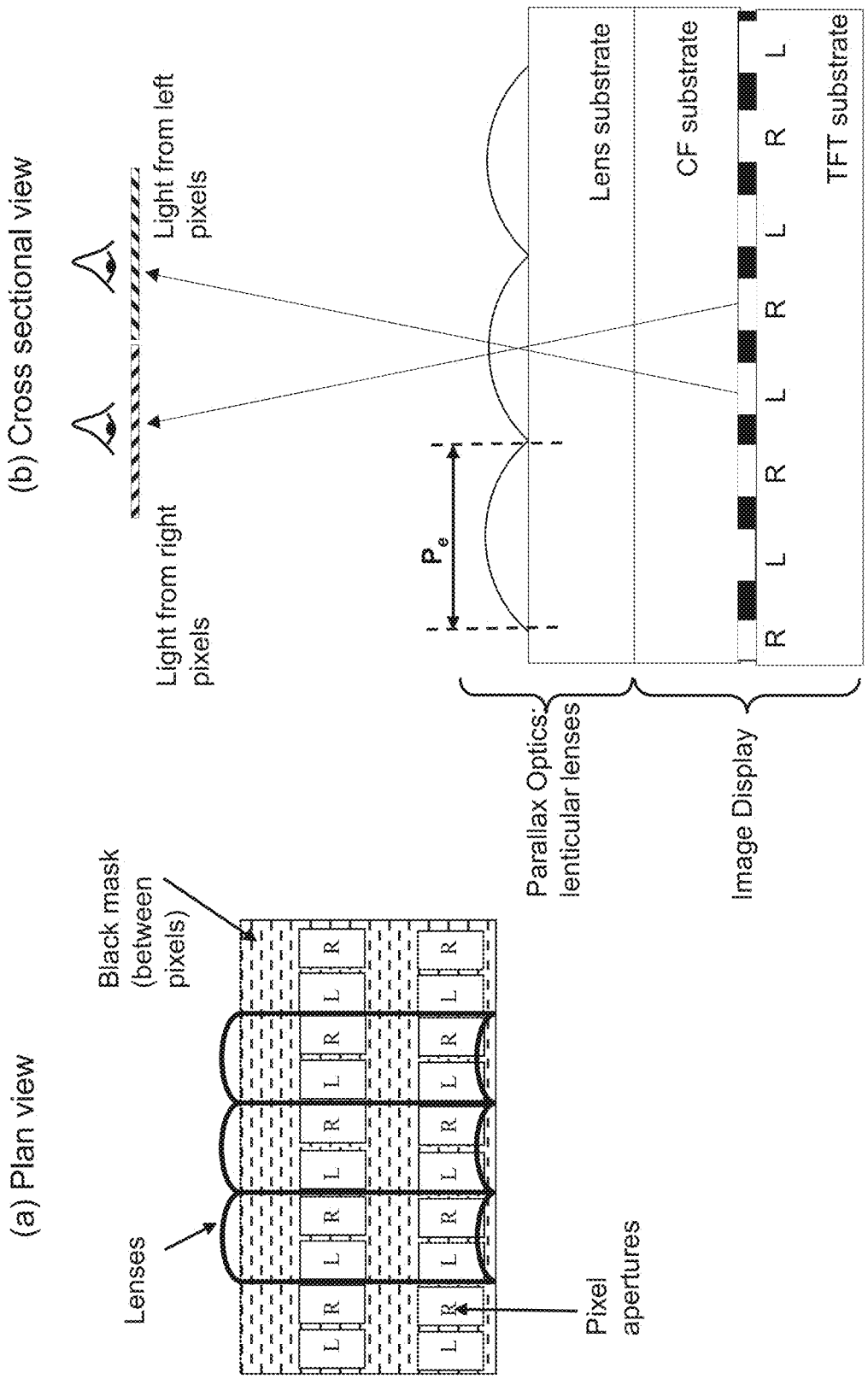
FIG. 2: A conventional 3D system including lenticular lenses and an image display

2 Liquid Crystal
4 Bistable surface substrate
6 Monostable surface substrate
8 Bistable liquid crystal alignment layer
9a Right eye
9b Left eye
10 First image display
10a First image display LCD
10b First Image display OLED
10P Linearly polarized light exiting the first image display
11 Liquid crystal display
12 Backlight
13 Polariser of the first image display 10
14 A first substrate of the first image display 10
15 Liquid crystal layer of the first image display 10
16 A second (uppermost) substrate of first image display 10
17 Polariser of the first image display 10
18 A quarter wave retardation film
19a Retardation film
19b Retardation film
19c Retardation film
19d Retardation film
20 Second image display
20P Display device in a portrait orientation
20L Display device in a landscape orientation
24 A first (lowermost) substrate of the second image display 20
24A Liquid crystal alignment direction
24e Electrode in a row configuration pertaining to the first substrate of the second image display 20
24e1 A first electrode 24e pertaining to the first substrate of the second image display 20
24ew1 Width of a first electrode 24e1 pertaining to the first substrate of the second image display 20
24e2 A second electrode 24e pertaining to the first substrate of the second image display 20
24ew2 Width of a second electrode 24e2 pertaining to the first substrate of the second image display 20
24eg Gap between electrodes pertaining to the first substrate of the second image display 20
25 A liquid crystal layer of the second image display 20
25a Hybrid aligned nematic state
25b Twisted nematic state
26 A second substrate of the second image display 20
26A Liquid crystal alignment direction
26a Liquid crystal alignment direction of the second substrate 26 of the second image display 20
26e Electrode in a column configuration pertaining to the second substrate of the second image display 20
26e1 A first electrode 26e pertaining to the second substrate of the second image display 20
26ew1 Width of a first electrode 26e1 pertaining to the second substrate of the second image display 20
26e2 A second electrode 26e pertaining to the second substrate of the second image display 20
26ew2 Width of a second electrode pertaining to the second substrate of the second image display 20
26eg Gap between electrodes pertaining to the second substrate of the second image display 20
27 Polariser of the second image display 20
27T Transmission axis of polariser
30 Reflective Polariser (Dual Brightness Enhancement Film)
30T Transmission axis of reflective polariser 30
30R Reflection axis of reflective polariser 30
40 Display system
50 Viewing side of display system
60 Organic light emitting display
61 An organic electroluminescent layer
70 A Zenithal Bistable Display (ZBD)
71 Super Twisted Nematic Liquid Crystal Display (STN)
72 Bistable Twisted Nematic Liquid Crystal Display (BTN)
73 Ferroelectric Liquid Crystal Liquid Crystal Display (FLC)
101 Information
102 A designated spatial region of the display
103 A further designated spatial region of the display
111 A lens element
112 A parallax barrier region
120 A controller
122 A function selector
124 Display data
130 Optical diffuser
Vd A 3D viewing distance e An interocular distance
$P_i$ A Pixel pitch or periodicity of the first image display 10
n An Average refractive index of material between layers (15, 61) and LC layer 25
s A distance between layers (15, 61) and LC layer 25
d A thickness of LC layer 25
$\Delta n$ A birefringence of the LC layer 25
$P_e$ A pitch or periodicity of light directing optics
f A focal length
a A lens aperture
n An average refractive index

DESCRIPTION OF EMBODIMENTS

The battery on mobile display devices, in particular Smartphones, requires recharging regularly because the display consumes a lot of power. However, for many smartphone usage scenarios, a viewer does not require full colour high resolution images, for example, checking the time, reading a text message or email etc. In addition to a full colour, high resolution image display mode, the provision of a low power display system that can convey information, such as text or simple pictures, would therefore enable smartphone users to reduce the smartphone power consumption and prolong the time required between battery recharges. As discussed in the conventional art, reflective bistable LCDs are ideally suited for display applications requiring very low power consumption.

When sunlight shines onto a display, images and text become hard to read. The provision of a display system that can clearly convey information to a user regardless of the strength of ambient sunlight would benefit a variety of applications, such as mobile phone, laptop PCs, automatic teller machines, advertising displays etc. As discussed in the conventional art, reflective LCDs are particularly useful for viewing images in high ambient lighting conditions.

As discussed in the conventional art, the use of a first image display in conjunction with a switchable optical element can be used to realise a display capable of a full resolution, full brightness normal image mode and a second directional image display mode. The directional display mode may be an autostereoscopic 3D display mode. The directional display mode may be a private display mode in which information is only discernable substantially on-axis. Although the autostereoscopic 3D display mode and/or the privacy display mode are attractive optical features, the switchable optical element adds substantial extra thickness, weight and cost to the display device. For many display applications, it is difficult to justify the added thickness, weight and cost of an additional switchable optical element.

According to an exemplary embodiment of the invention, a display is provided that includes a first image display and a second image display with a reflective polariser (e.g., DBEF) sandwiched between the first and second image display. The first and second image displays and DBEF are stacked such that the second image display is disposed on the viewing side. The first image display may be a liquid crystal display (LCD), organic light emitting diode (OLED) etc. and is capable of displaying high resolution, full colour images. The second image display is a liquid crystal display. The second image display does not contain opaque Thin Film Transistors (TFT) and an image is displayed on the second image display via a passive addressing scheme (Duty-type driving) or a further addressing scheme that does not employ the use of opaque transistors or any other addressing components with substantially opaque features. The second image display preferably does not contain colour filters or any features that would provide an intrinsic, non-switchable parallax effect or moiré effect between the first and second image displays. The second image display is used in conjunction with the first image display to yield a display system that has multiple image displays functions, including a low power display mode with excellent sunlight readability and a 3D mode.

According to an aspect, a first display function may be realised whereby the second image display is uniformly switched into a first, transparent state and reveals the information displayed by the first image display.

According to an aspect, a second display function may be realised whereby no image is addressed to the first image display and the second image display is uniformly switched into second state so the display system acts like a plane mirror and appears as a reflective surface to the viewer. If the first image display has an associated backlight, then the backlight is switched off.

According to an aspect, a third display function may be realised whereby no image is addressed to the first image display and an image is addressed to the second image display to create a patterned mirror that may convey information, such as text or simple pictures. If the first image display has an associated backlight, then the backlight is switched off.

According to an aspect, a fourth display function may be realised whereby an image is addressed to the second image display to create a patterned mirror that may convey information, such as text or simple pictures, and an image is addressed to the first image display such that the visual effect of the patterned mirror is enhanced by the image displayed on the first image display. If the first image display has an associated backlight, then the backlight is switched on.

According to an aspect, a fifth display function may be realised whereby an autostereoscopic three dimensional (hereafter "3D") image is addressed to the first image display and an image is addressed to the second image display that creates a parallax optic such that the three dimensional image on the first display is viewable with the naked eye. The parallax optic may form a parallax barrier. The parallax optic may form a lens array. The parallax optic may form a lens array whereby a parallax barrier is disposed between the lens elements.

According to an aspect, a sixth display function may be realised whereby the an image is addressed to the first image display and an image is addressed to the second image display such that the second image display becomes an obscuring optic in order that the image of the first display is substantially viewable on-axis of the display system but is substantially obscured from view off-axis and therefore produces a private viewing mode.

Figure 4:
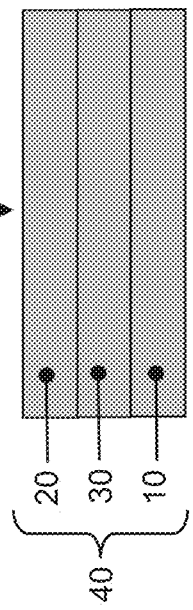
FIG. 4: A display system

With reference to FIG. 4, a display system 40 includes a first image display 10, a second image display 20 and a reflective polariser 30, such as a Dual Brightness Enhancement Film (DBEF). The reflective polariser 30 may have specular reflection properties or diffuse reflection properties. The display system 40 may also include a touch-screen (not shown) for inputting information that may be intrinsic or extrinsic to the first and second image displays 10, 20. The reflective polariser 30 is sandwiched between the first image display 10 and second image display 20. The second image display 20 is disposed on the viewing side 50 of the display system 40. The reflective polariser 30 may, for example, be laminated to the either first image display 10 or the second image display 20. The reflective polariser 30 may, for example, be adhered to the first image display 10 or the second image display 20 via the use of an optical adhesive.

The first image display 10 may be a liquid crystal display (LCD) 11 (FIG. 5) or an organic light emitting display (OLED) 60 (FIG. 6) or any other type of image display. The first image display 10 is pixelated and capable of displaying high resolution, full colour images. The first image display 10 may be a passively addressed display or may be an actively addressed display. The second image display 20 is a liquid crystal display which also is pixelated. The second image display does not contain opaque Thin Film Transistors (TFT) and an image is displayed on the second image display 20 via a passive addressing scheme (Duty-type driving) or a further addressing scheme that does not employ the use of opaque transistors. The second image display 20 does not contain colour filters or any features that would provide an intrinsic, non-switchable parallax effect or moiré effect between the first image display 10 and second image display 20.

Figure 5:
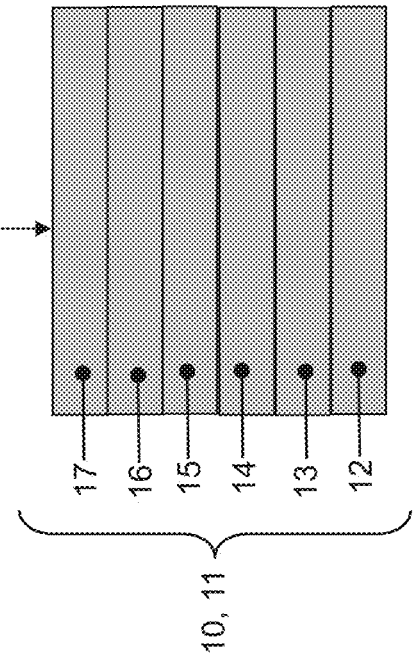
FIG. 5: A liquid crystal type first image display, side view

With reference to FIG. 5, the first image display 10 may be a liquid crystal display 11 which includes a backlight 12, a first polariser 13, a first substrate 14, a liquid crystal layer 15, a second (uppermost) substrate 16 and a second polariser 17. The second polariser 17 is disposed on the viewing side 50 of the liquid crystal display 11. Optical retardation films that improve the viewing angle performance and contrast ratio of the liquid crystal display 11 may be disposed between the first polariser 13 and the first substrate 14 and/or disposed between the second substrate 16 and the second polariser 17. For diagrammatic clarity, alignment layers, control electronics, optical retardation films that improve the viewing angle performance and contrast ratio, etc., of the first image display 10 have been omitted.

Figure 6:
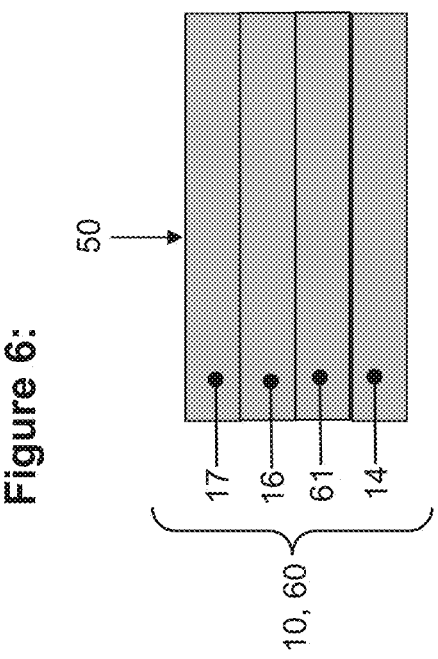
FIG. 6: An organic light emitting type first image display, side view

With reference to FIG. 6, the first image display 10 may be an organic light emitting display 60 which includes a first substrate 14, an organic electroluminescent layer 61 and a second substrate 16. The organic light emitting display 60 may have a polariser 17 disposed on the viewing side 50 of the organic light emitting display 60.

With reference to FIG. 5 and FIG. 6, the polariser 17 may be a circular polariser or may be a linear polariser. If the polariser 17 is composed of a retardation film(s) and a linear polariser in order to yield a circular polariser, then the linear polariser part of this composition is disposed on the viewing side 50 of the first image display 10. Consequently, the light emitted from the first image display 10 will be linearly polarised.

With reference to FIG. 7, the second image display 20 is a liquid crystal display which includes a first (lowermost) substrate 24, a liquid crystal layer 25, a second substrate 26 and second polariser 27. Optical retardation films that improve the viewing angle performance and contrast ratio of the second image display 20 may be disposed on the outer face of the first substrate 24 and/or disposed between the second substrate 26 and the second polariser 27. For diagrammatic clarity, optical retardation films that improve the viewing angle performance and contrast ratio of the second image display 20 have been omitted. For diagrammatic clarity, the LC alignment layers, control electronics etc. pertaining to the second image display 20 has also been omitted from FIG. 7.

A preferred configuration of the display system 40 that includes an LCD 11 as the first image display 10 is illustrated by FIG. 4, FIG. 5 and FIG. 7. A preferred configuration of the display system 40 that includes an OLED 60 as the first image display 10 is illustrated by FIG. 4, FIG. 6 and FIG. 7. It will be appreciated by those skilled in the art of polarisation optics that the functionality of the preferred configurations of the display system 40 may also by achieved via alternative arrangements of optical films that control the polarisation state of light, such as polariser and retardation films. With reference to FIGS. 8a, 8b, 8c, 8d, and 8e, shown in relevant part are various combinations of polariser 17 (FIGS. 8c, 8d, and 8e) reflective polariser 30 (FIGS. 8a, 8b, 8c, 8d, and 8e) and retardation films (FIGS. 8b, 8d, and 8e) 19a, 19b, 19c, 19d that can be contrived in order to realise the display system 40 in various embodiments. In general, the transmission axis associated with the polariser 17 and the transmission axis of the reflective polariser 30 are aligned parallel to each other in order to minimise the number of optical components within the display system 40. However, if the transmission axis associated with the polariser 17 and the transmission axis of the reflective polariser 30 are not aligned parallel to each other, a retardation film, such as a half wave plate, may be inserted between the polariser 17 and the reflective polariser 30. If a half waveplate is inserted between the polariser 17 and the reflective polariser 30, the optical axis of the half waveplate is arranged to bisect the transmission axis associated with the polariser 17 and the transmission axis of the reflective polariser 30.

With reference to FIG. 8a, the display system 40 may include a reflective polariser 30 positioned between the second substrate 16 of the first image display 10 and the first substrate 24 of the second image display 20. In this embodiment, the polariser 17 has been omitted from the first image display 10. When the first image display 10 is an OLED 60, the polariser 17 is not essential for the operation of the first image display 60 but is often included in order to reduce reflections from the image display layer 61 that degrade image quality. Substantial reflections from the image display layer 61 may occur if the image display 61 layer contains at least a first reflective electrode. If the polariser 17 is used in conjunction with the first image display 60 then the polariser 17 is usually a circular polariser. When the first image display 10 is an LCD 11, for optimum display characteristics such as contrast ratio and viewing angle, it is preferable for the polariser 17 to be present. However, in order to reduce cost and reduce the overall thickness of the display system 40, polariser 17 may be removed and polariser 27 enables an image to be display on the first image display 11.

With reference to FIG. 8b, the display system 40 may include a retardation film 19a and a reflective polariser 30 positioned between the second substrate 16 of the first image display 10 and the first substrate 24 of the second image display 20. Again the polariser 17 may be omitted. The retardation film 19a may be an optical quarter waveplate. If the retardation film 19a is an optical quarter waveplate orientated at 45° to the transmission axis of the reflective polariser 30 then ambient light incident on the first image display 10 will be circularly polarised. It is preferable that circularly polarised is incident is incident upon the first image display 10 especially if the first image display 10 is an OLED 60 with reflective electrodes. Illumination of the first image display 10 with a circularly polarised light may improve the contrast ratio of the image display 10. The retardation film 19a may be an optical half wave-plate and used to rotate the orientation of linearly polarised light from the first image display 10 to the second image display 20 and vice versa.

With reference to FIG. 8c, the display system 40 may include polariser 17 and reflective polariser 30 directly between the second substrate 16 of the first image display 10 and the first substrate 24 of the second image display 20. As discussed previously, this is a preferred configuration of polarisation optics and is included here for completeness. In essence, FIG. 8c simply highlights the order of components in the preferred embodiments of the display system 40, focusing attention on the uppermost layers of the first image display 10 and the lowermost layers of the second image display 20.

With reference to FIG. 8d, the display system 40 may include polariser 17, retardation film 19b and reflective polariser 30 directly beneath the first substrate 24 of the second image display 20. The retardation film 19b may be an optical half waveplate and used to rotate the orientation of linearly polarised. For example, the retardation film 19b may be configured so that the linearly polarised light transmitted through the polariser 17 is rotated and aligned with the transmission axis of the reflective polariser 30. In this embodiment, the optical axis of the half waveplate is arranged to bisect the transmission axis associated with the polariser 17 and the transmission axis of the reflective polariser 30.

With reference to FIG. 8e, the display system 40 may include polariser 17, retardation film 19c, reflective polariser 30 and retardation film 19d between the second substrate 16 of the first image display 10 and the first substrate 24 of the second image display 20. The retardation film 19c may be an optical half waveplate and used to rotate the orientation of linearly polarised. For example, the retardation film 19c may be configured so that the linearly polarised light transmitted through the polariser 17 is rotated and aligned with the transmission axis of the reflective polariser 30. The retardation film 19d may be an optical half waveplate or optical quarter wave-plate or a waveplate of predetermined value to optimise display quality metrics.

With reference to FIGS. 8a, 8b, 8c, 8d and 8e, it is advantageous that the display system 40 has as few optical components as possible so that the display system 40 is thin, light and inexpensive to manufacture. However, in general, the use of more optical components will improve the metrics of the display system 40 in terms of viewing angle, contrast etc. since the display metrics of the first image display 10 and the display metrics of the second image display 20 can be independently optimised. Consequently, FIG. 8a illustrates a display system 40 optimised to be thin, light and cheap to manufacture while FIG. 8e illustrates a display system 40 that is likely to have improved display metrics over FIG. 8a. FIGS. 8b, 8c and 8d illustrate display systems 40 that intended to optimise the display metrics while keeping the number of components to a minimum. FIG. 8b is a particularly good configuration when the first image display 10 is a conventional OLED display 60. FIGS. 8c and 8d are particularly good configurations for use with a first image display 10 that is a conventional LCD 11. The various configurations of optical elements in the display system 40 as illustrated by FIGS. 8a, 8b, 8c, 8d, and 8e are not exhaustive and one skilled in the art of polarising optics and displays will be able to conceive other substantially equivalent configurations.

Figure 9:
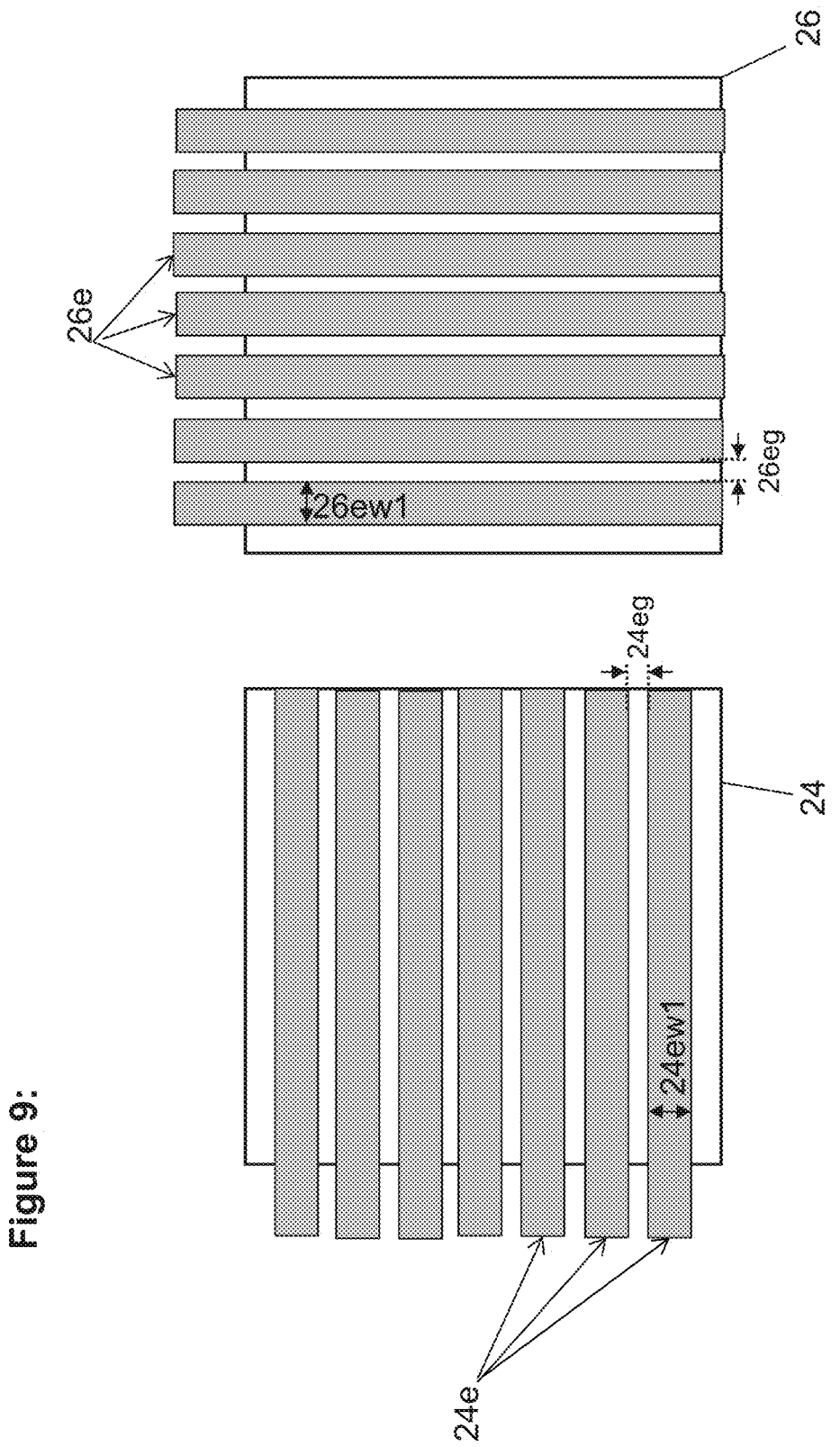
FIG. 9: Electrodes pertaining to the second image display

With reference to FIG. 9, the second image display 20 includes a matrix array of substantially transparent electrodes 24e, 26e (not shown to scale). The electrodes are arranged in a passive matrix arrangement and serve as addressing components. The electrodes are made of indium tin oxide or any other suitable transparent material. By utilizing a conventional passive addressing scheme with transparent electrodes 24, 26, the second image display 20 avoids additional addressing components such as TFTs which may be opaque and thereby degrade the quality of the image from the first image display 10. Of course, other types of addressing components and schemes may be utilized without departing from the scope of the invention. The first substrate 24 of the second image display 20 may have multiple row electrodes 24e while the second substrate 26 of the second image display 20 may have multiple column electrodes 26e. A suitable LC alignment layer (not shown) is disposed on top of the electrodes 24e and 26e. When the substrates 24 and 26 are assembled together, the electrodes 24e and 26e form a matrix array of electrodes with an LC layer 25 sandwiched between the substrates 24 and 26. Suitable electronic waveforms are applied to the electrodes 24e and 26e in a standard passive addressing fashion (e.g., using row and column drivers (not shown)) to spatially switch the LC material. The individual pixels of the second image display 20 are defined by overlapping areas of electrodes 24e and 26e. The width 24ew1 of the electrodes 24e may be uniform. The width 26ew1 of the electrodes 26e may be uniform. The width 24ew1 of the electrodes 24e may be the same as the width 26ew1 of the electrodes 26e1. The width 24ew1 of the electrodes 24e may be different to the width 26ew1 of the electrodes 26e. The gap 24eg between successive electrodes 24e may be uniform. The gap 26eg between successive electrodes 26e may be uniform. The pixels defined by the overlapping electrodes 24e and 26e may be square or rectangular.

Figure 10:
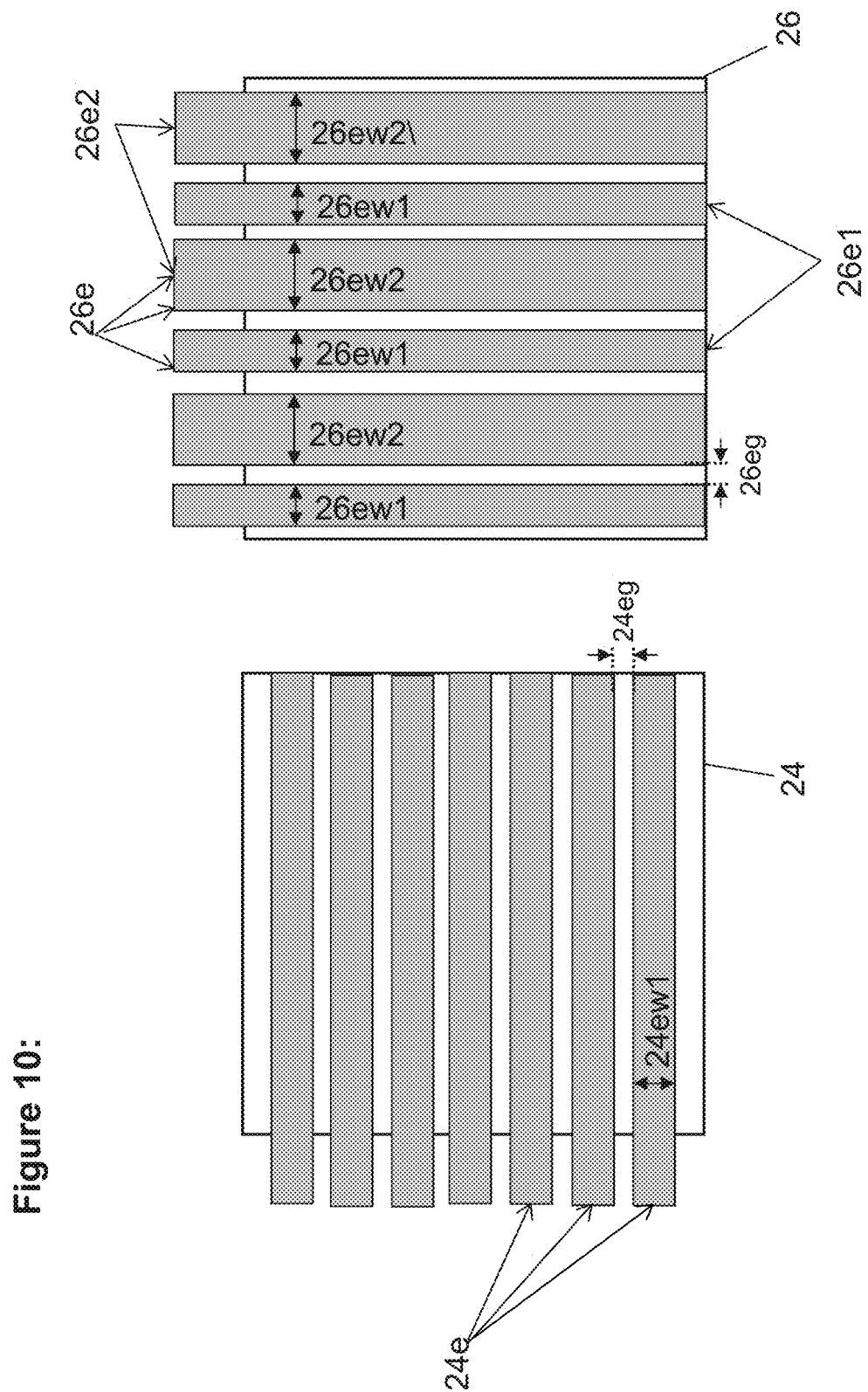
FIG. 10: Electrodes pertaining to the second image display

With reference to FIG. 10, according to another embodiment the first substrate 24 of the second image display 20 may have multiple row electrodes 24e of uniform width 24ew1 while the second substrate 26 of the second image display 20 may have multiple column electrodes 26e of alternating widths 26ew1 and 26ew2. Alternatively, the first substrate 24 of the second image display 20 may have multiple column electrodes 24e of uniform width 24ew1 while the second substrate 26 of the second image display 20 may have multiple row electrodes 26e of alternating widths 26ew1 and 26ew2. The widths 26ew1, 26ew2 of electrodes 26e1 and 26e2 may be configured so as to realise a period parallax barrier, which in turn can direct light from the first image display 10 to enable the viewing of autostereoscopic images in a first orientation. Alternatively, the widths 26ew1, 26ew2 of electrodes 26e1 and 26e2 may be configured so as to realise a periodic lens array, which in turn can direct light from the first image display 10 to enable the viewing of autostereoscopic images in a first orientation. As another alternative, the widths 26ew1, 26ew2 of electrodes 26e1 and 26e2 may be configured so as to realise a periodic array of lens and parallax elements, which in turn can direct light from the first image display 10 to enable the viewing of autostereoscopic images in a first orientation. The periodic array of lens and parallax elements may have parallax barrier elements disposed between each lens element.

Figure 11:
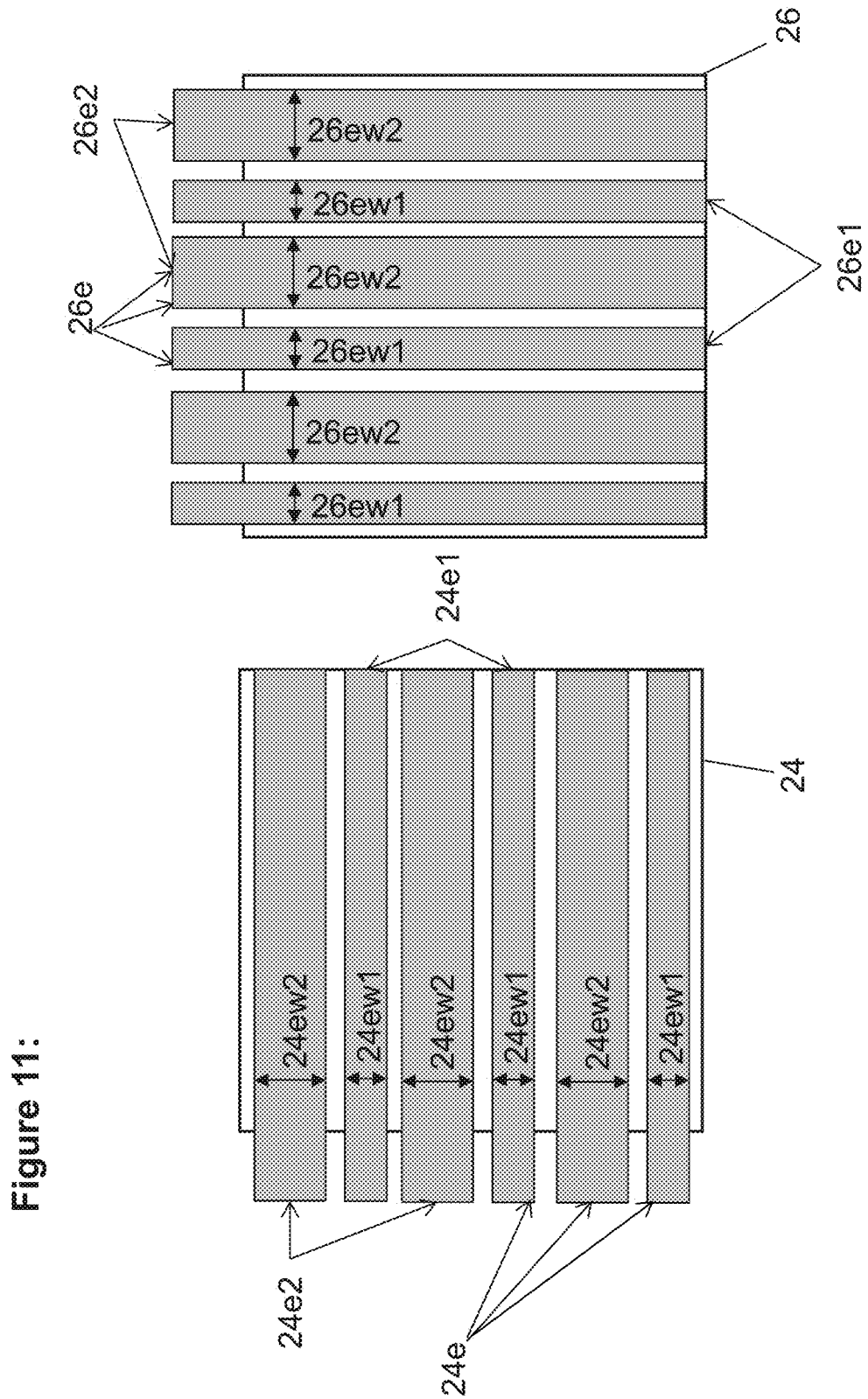
FIG. 11: Electrodes pertaining to the second image display

With reference to FIG. 11, the first substrate 24 of the second image display 20 may have multiple row electrodes 24e of alternating widths 24ew1 and 24ew2 while the second substrate 26 of the second image display 20 may have multiple column electrodes 26e of alternating widths 26ew1 and 26ew2. The widths 26ew1, 26ew2 of electrodes 26e1 and 26e2 may be configured so as to realise a period parallax barrier, which in turn can direct light from the first image display 10 to enable the viewing of autostereoscopic images in a first orientation. The widths 24ew1, 24ew2 of electrodes 24e1 and 24e2 may be configured so as to realise a period parallax barrier, which in turn can direct light from the first image display 10 to enable the viewing of autostereoscopic images in a second orientation. Alternatively, the widths 26ew1, 26ew2 of electrodes 26e1 and 26e2 may be configured so as to realise a periodic lens array, which in turn can direct light from the first image display 10 to enable the viewing of autostereoscopic images in a first orientation. As another alternative, the widths 24*ew*1, 24*ew*2 of electrodes 24*e*1 and 24*e*2 may be configured so as to realise a periodic lens array, which in turn can direct light from the first image display 10 to enable the viewing of autostereoscopic images in a second orientation. As yet another alternative, the widths 26*ew*1, 26*ew*2 of electrodes 26*e*1 and 26*e*2 may be configured so as to realise a periodic array of lens and parallax elements, which in turn can direct light from the first image display 10 to enable the viewing of autostereoscopic images in a first orientation. The periodic array of lens and parallax elements may have parallax barrier elements disposed between each lens element. The widths 24*ew*1, 24*ew*2 of electrodes 24*e*1 and 24*e*2 may be configured so as to realise a periodic array of lens and parallax elements, which in turn can direct light from the first image display 10 to enable the viewing of autostereoscopic images in a second orientation.

A first display function of the display system 40 enables the viewer to view the first image display 10 as if the second image display 20 was not present. More specifically, the second image display 20 is switched into a state that renders it substantially transparent to the light emitted by the first image display 10. By substantially transparent, it is intended that at least 75% of light incident on the second image display 20 from the reflective polariser 30 is transmitted. Preferably, at least 90% of light incident on the second image display 20 from the reflective polariser 30 is transmitted. The LC mode pertaining to the second image display 20 may be a Normally White mode. A Normally White mode will transmit light emitted from the first image display 10 when no voltage is applied across the LC layer 25. The LC mode pertaining to the second image display 20 may be a Normally Black mode. A Normally Black mode will transmit light emitted from the first image display 10 when a suitable voltage is applied across the LC layer 25. In general, it is advantageous to use a Normally White configuration of polarising optics for the second image display 20 so as to avoid unwanted parallax effects caused by the electrode gaps 24*eg* and/or 26*eg*. If a bistable LC mode is employed in the second image display 20, then no voltage is required to maintain either a black image or a white image (a voltage is only required to switch between black and white states). However, it is still advantageous to arrange the polarising optics in such a bistable LCD so that the electrode gaps 24*eg* and/or 26*eg* do not cause absorption of light emitted from the first image display (i.e. the electrode gaps 24*eg* and/or 26*eg* do not cause unwanted parallax effects). Since the second image display 20 must be capable of being switched into a substantially transparent state, the second image display 20 does not include opaque thin film transistor (TFTs) or any other opaque elements (at least to any viewer perceptible extent) that are either directly visible or that render a visible artefact, such as parallax or Moiré, in the image presented by first image display 10.

A second display function of the display system 40 is a reflective mode that enables the viewer to view a reflected image. Via the application of suitable drive voltages using conventional passive addressing techniques, the second image display 20 has a liquid crystal configuration that affects the polarisation state of ambient light such that it is substantially reflected from the reflective polariser 30. Light that is reflected from the reflective polariser 30 is observed by the display system's viewer. When the second display function is activated, the first image display 10 may be switched off in order to conserve power consumption. The second display function may be used as a vanity mirror. The second display function may be used as a "stand-by" display mode for cosmetic purposes.

A third display function of the display system 40 enables the viewer to view information on the second image display 20 while the first image display is switched off (or displays no image). Via the application of suitable drive voltages, again via conventional passive addressing techniques, the second image display 20 has at least two liquid crystal configurations for modifying the polarisation state of ambient light. The first liquid crystal configuration affects the polarisation state of ambient light such that it is substantially transmitted through the reflective polariser 30 toward the first image display 10. Light that is transmitted through the reflective polariser 30 is absorbed by the optical components (for example, the polariser 17) of the first image display 10. Consequently, this first liquid crystal configuration appears black to the viewer. The second liquid crystal configuration affects the polarisation state of ambient light such that it is substantially reflected from the reflective polariser 30. Light that is reflected from the reflective polariser 30 is observed by the viewer of the display 40 system. Consequently, a pixel pertaining to the second image display 20 can be configured to either appear black or reflect ambient light. Via the application of a suitable voltages, further liquid crystal configurations are possible that enable a significant proportion of the incident light to be reflected from the reflective polariser 30 and a significant proportion of the incident light to be absorbed by the optical components (for example, the polariser 17) of the first image display 10, i.e. a partially reflecting pixel can be realised.

The third display function of the display system 40 enables the viewer to view the second image display 20 while the first image display is switched off (or displays no image), and thus may be used as a low power display mode. The third display function of the display system 40 may be used as a "stand-by" display mode that displays information while the first image display is in "stand-by" mode (i.e. the first image display is on but conveys no information). The third display function of the display system 40 may be used to convey information in high ambient lighting conditions, such as strong sunlight. High ambient lighting conditions generally degrade the readability of many displays; however, the third display function of the display system 40 can easily convey information to the viewer that is readable in even the strongest ambient light conditions.

Figure 12:
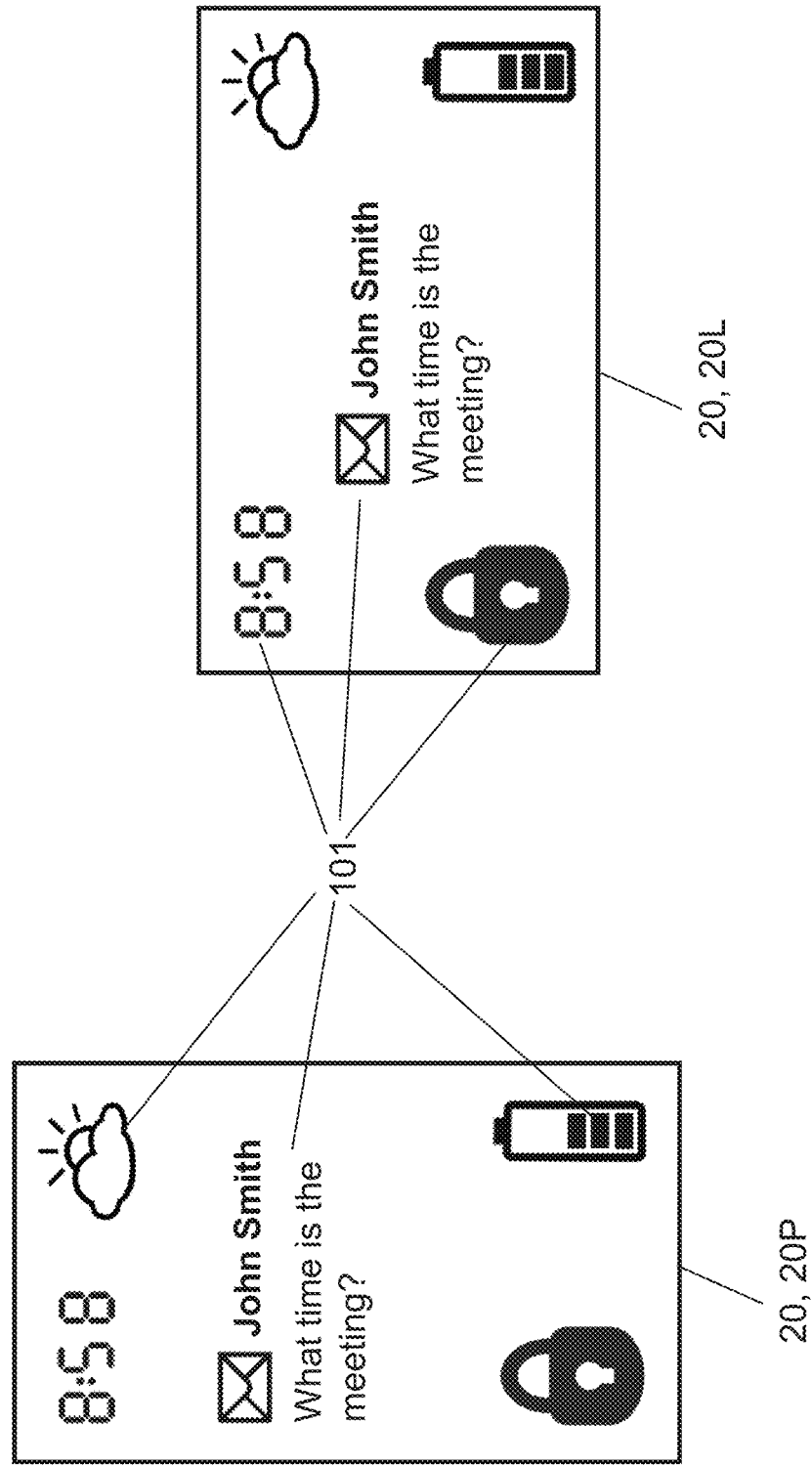
FIG. 12: Information displayed on the second image display, plan view

With reference to FIG. 12, the second image display 20 is used to realise a third display function of the display system 40 to convey information 101 such as time, date, new messages alert (text, email, voice mail etc.), display of any new messages, battery power, network signal strength, Wi-Fi, device lock/unlock, information from application software ("apps"), logos, decorative features, advertising, geometrical shapes, non-geometrical shapes etc. With reference to FIG. 12, the second image display 20 may be viewed in a portrait orientation of the display device 20P and/or a landscape orientation of the display device 20L. Access and/or manipulation of information 101 displayed by the second image display 20 may be controlled via input from the viewer via a touch-screen, gestures, buttons, sliders etc. Information displayed on the second image display 20 may have a layout substantially similar to the information layout attributed to the first image display 10 for style and/or, ease of use purposes.

Figure 13:
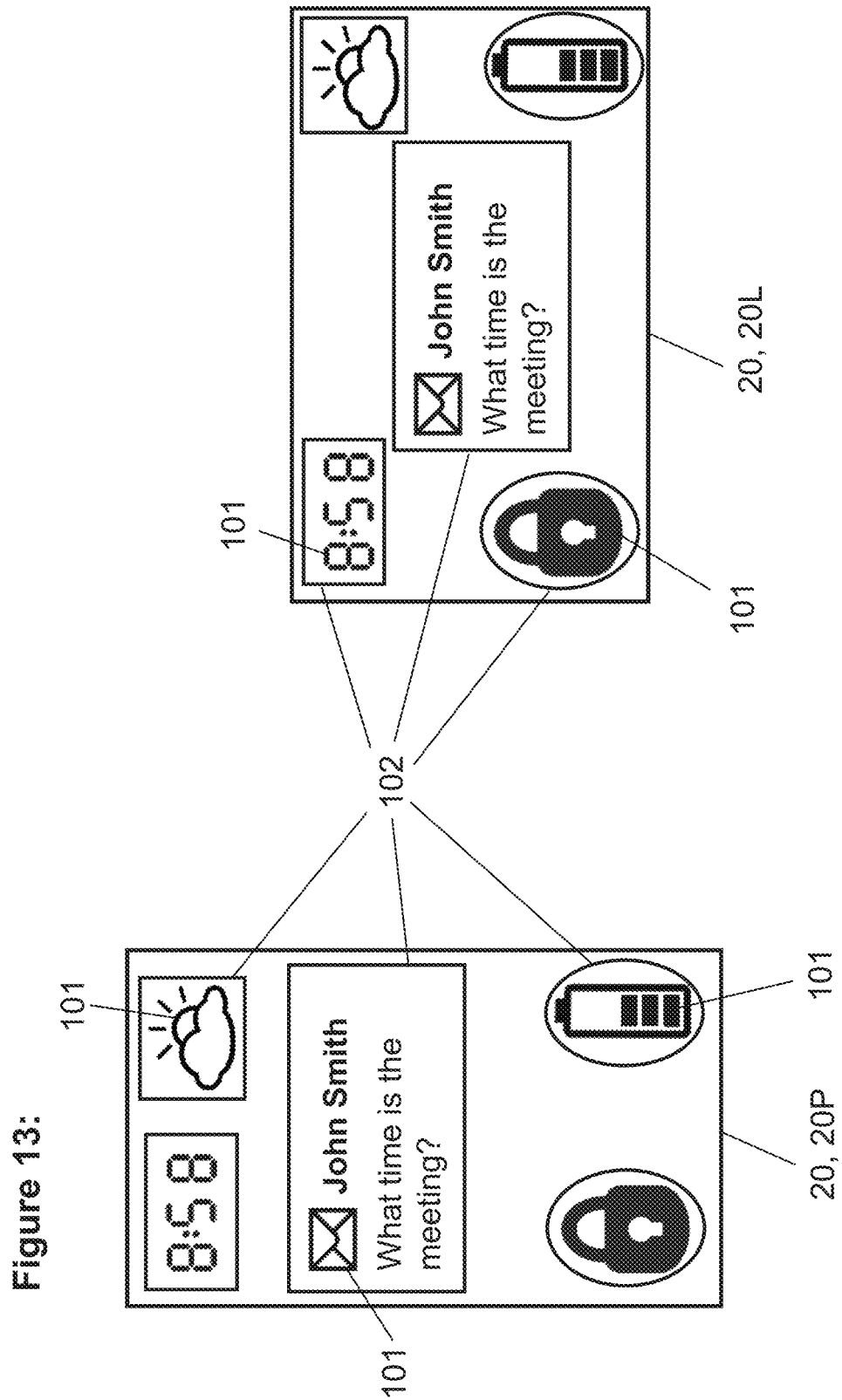
FIG. 13: Information displayed on the second image display, plan view
Figure 14:
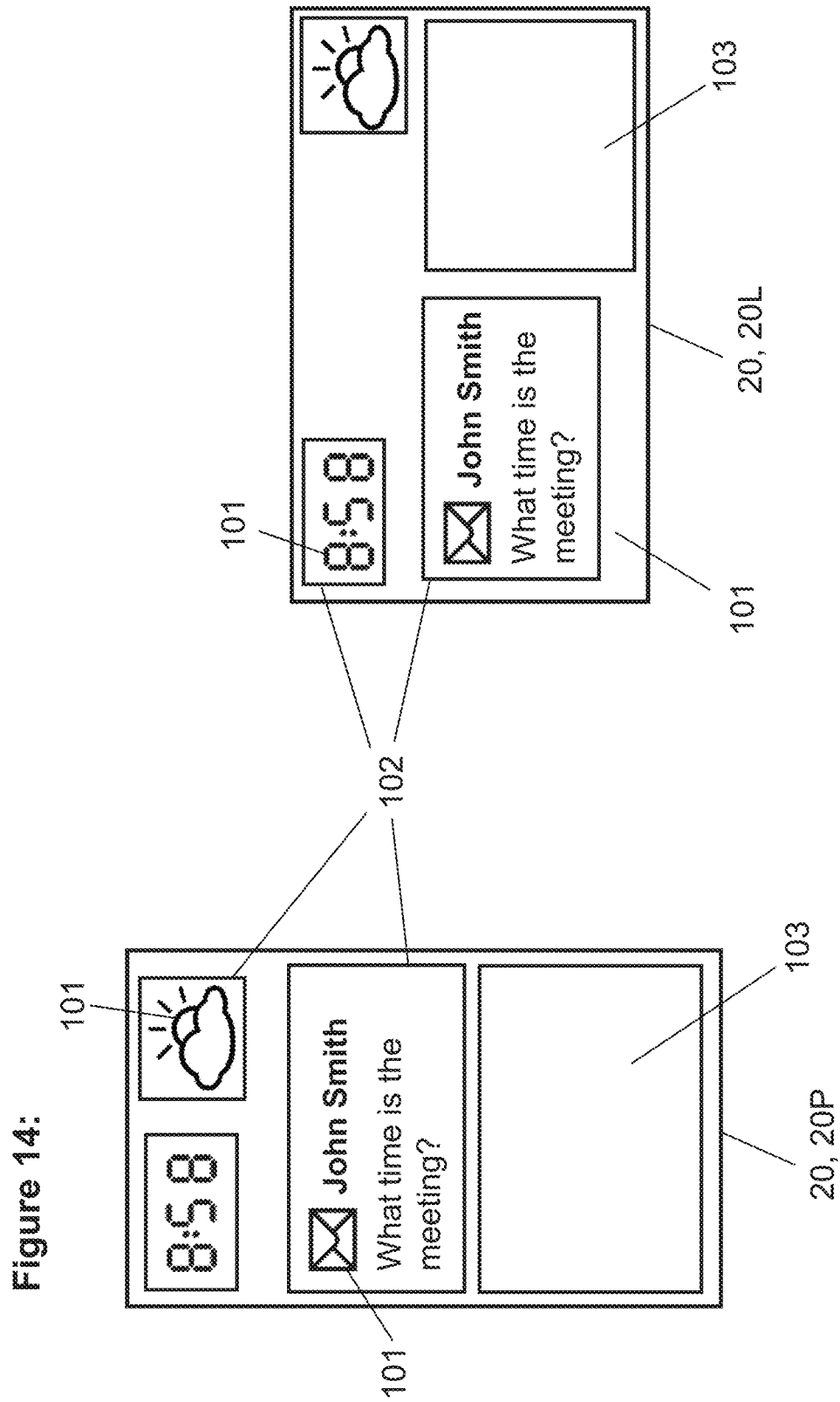
FIG. 14: Information displayed on the second image display, plan view

A fourth display function of the display system 40 enables the viewer to view the second image display 20 and the first image display 10 simultaneously using any combination of the first thru third display functions described above. Consequently, the display system 40 may convey information that is a combination of black, white, coloured and reflective regions. A first example of the fourth display function is shown in FIG. 13. The second image display 20, 20P, 20L is used to convey information 101, such as time, date, new messages etc as described previously. The information 101 may be surrounded by designated spatial regions 102. The first image display 10 may display images in the designated spatial regions 102 that may or may not be colour coloured. The designated spatial regions 102 may or may not be animated. When viewing the information 101 in conjunction with the designated spatial regions 102, an unexpectedly attractive display mode is realised. A second example of the fourth display function is shown in FIG. 14. In addition to the information 101 surrounded by the designated spatial regions 102, a further region 103 may be realised that conveys information from the first image display 10 in a standard fashion. The second image display 20 is switched into the transparent state in the region 103.

The fourth display function of the display system 40 may be used to convey information in high ambient lighting conditions, such as strong sunlight. High ambient lighting conditions generally degrade the readability of many displays; however, the fourth display function of the display system 40 can easily convey information to the viewer that is readable in even the strongest ambient light conditions.

A fifth display function of the display system 40 enables the viewer to view 3D images. Interlaced 3D images are addressed to the first image display 10 in a standard fashion while the second image display 20 directs the stereoscopic images to the corresponding eyes of the viewer. The second image display 20 is addressed in a predetermined fashion in order to realise an imaging function. The imagining function of the second image display 20 may be performed by an array of parallax barriers. Alternatively, the imagining function of the second image display 20 may be performed by an array of liquid crystal lenses. Alternatively, the imagining function of the second image display 20 may be performed by an array of liquid crystal lenses where each lens adjoins a parallax barrier element.

A touch input device or function may be incorporated into the display system 40 so that the viewer may interact with information displayed on the first image display 10. A touch input device or function may be incorporated into the display system 40 so that the viewer may interact with information displayed on the second image display 20. The touch input device or function pertaining to the first image display 10 and the second image 20 display may be the same touch input device or function or different touch input devices and/or function(s).

Figure 15:
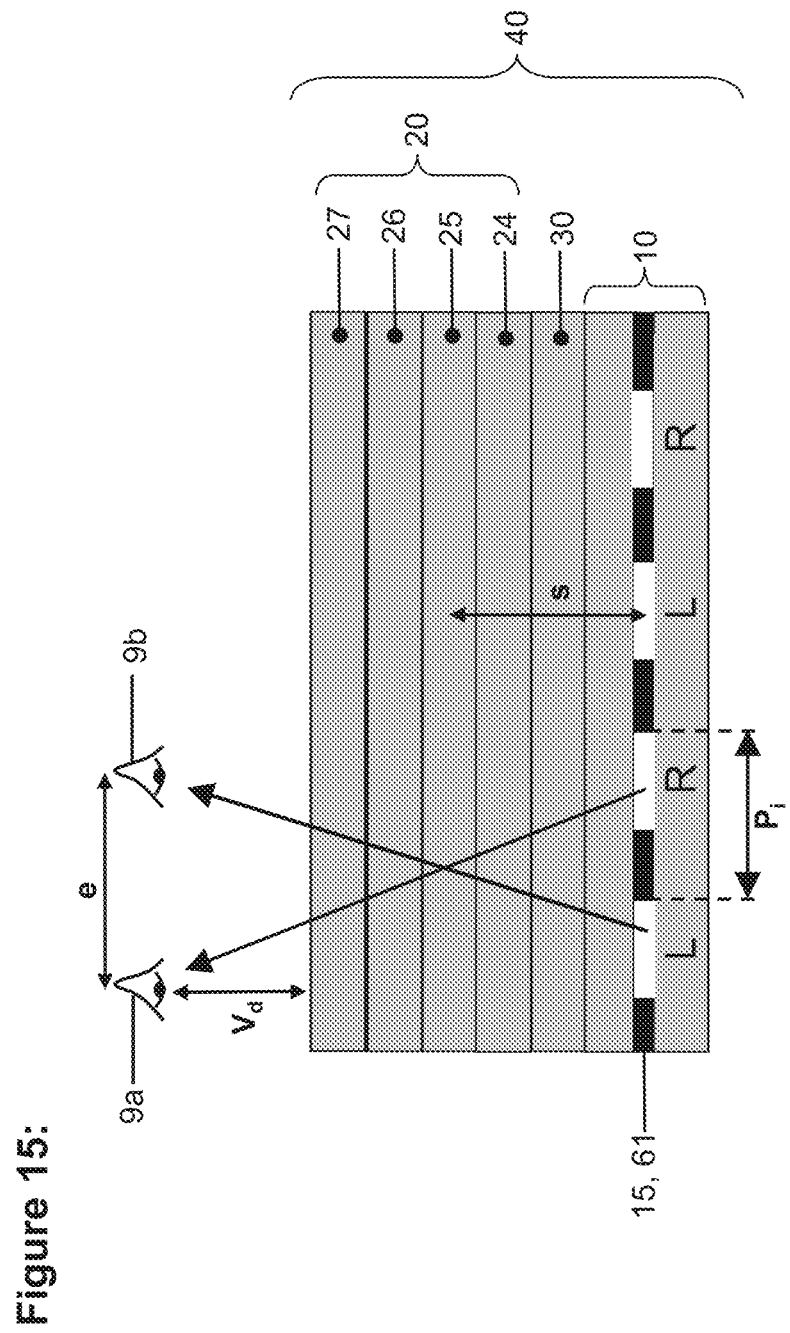
FIG. 15: Display system for autostereoscopic 3D image viewing

A display system 40 capable of a 3D autostereoscopic mode is illustrated in FIG. 15. The 3D (or three-dimensional) viewing distance, $V_d$, is calculated from $(e.s)/(n.P_i)$, where e is the interocular distance, $P_i$ is the pixel pitch of the first image display 10, n is the average refractive index of the material between the liquid crystal layer 15 or organic electroluminescent layer 61 of the first image display 10 and the liquid crystal layer 25 of the second image display 20 and s is the distance between the liquid crystal layer 15 or organic electroluminescent layer 61 of the first image display 10 and the liquid crystal layer 25 of the second image display 20. Three-dimensional autostereoscopic images are displayed on the first image display 10. A 2-View 3D autostereoscopic display presents two images of different perspective to the viewer. The first image is directed towards the viewer's left eye and the second image is directed towards the viewer's right eye. With reference to FIG. 15, the left image and right image may be addressed to alternating pixels of the first image display 10. The left and right images are directed to the left 9b and right 9a viewer's eyes respectively. In order to direct the correct image to the correct eye, the second image display 20 may be used to form a periodic array of parallax barriers or a periodic array of lens elements or a periodic array of lens and parallax barrier elements. For a 2-View 3D autostereoscopic display mode, the pitch or periodicity $P_e$ of the light directing optics pertaining to the second image display 20 (not shown in FIG. 15) may be approximately twice the pixel pitch or periodicity $P_i$ of the first image display. In order to correct for view point, the exact pitch or periodicity $P_e$ of the light directing optics pertaining to the second image display 20 is arranged to be equal to $(2*P_i)/(1+s/e)$.

Common parallax barrier designs used in 2-View 3D autostereoscopic systems have an aperture of between 20% and 50% of the light directing optics pitch or periodicity $P_e$ (i.e. the ratio of parallax barrier to aperture is between 4:1 and 1:1 respectively). Preferred parallax barrier designs used in 2-View 3D autostereoscopic systems have an aperture of ~35% of the light directing optics pitch or periodicity $P_e$.

It will be appreciated to those skilled in the art of 3D autostereoscopic displays that the display system 40 may be configured to be an N-View 3D autostereoscopic display system (multi-view display system) where N images of N different perspectives are displayed on the first image display 10 and the N images are each directed into a unique angular viewing zones by light directing optics. As described in the literature, an N-View (multi-view) 3D autostereoscopic display system (N>5) has the advantage over a 2-View 3D system in that 3D images can be simultaneously presented to multiple viewers and the 3D head viewing freedom for each viewer is relatively large wide. As described in the literature, an N-View (multi-view) 3D autostereoscopic display system (N>5) has the disadvantage over a 2-View 3D system in that 3D images presented to each viewer are of lower resolution.

A preferred embodiment uses a Zenithal Bistable Liquid Crystal Display (ZBD) 70 (FIG. 16)), which may also be known as a Zenithal Bistable Nematic (ZBN), as the second image display 20 and a reflective polariser 30 that has specular reflection properties. The operation of the ZBD 70 has been disclosed extensively in the literature. A ZBD has at least a first bistable LC alignment surface. The bistable LC alignment surface may be comprised of holes that have a shape and/or orientation to induce two different LC tilt angles at substantially the same azimuth direction. Alternatively, the bistable LC alignment surface may be comprised of a grating that can induce two different LC tilt angles. Henceforth, only a ZBD that has a bistable LC alignment surface comprised of a grating will be discussed but it will be appreciated that the grating is not the only bistable liquid crystal alignment surface that may be used to realise the preferred embodiment.

Figure 3:
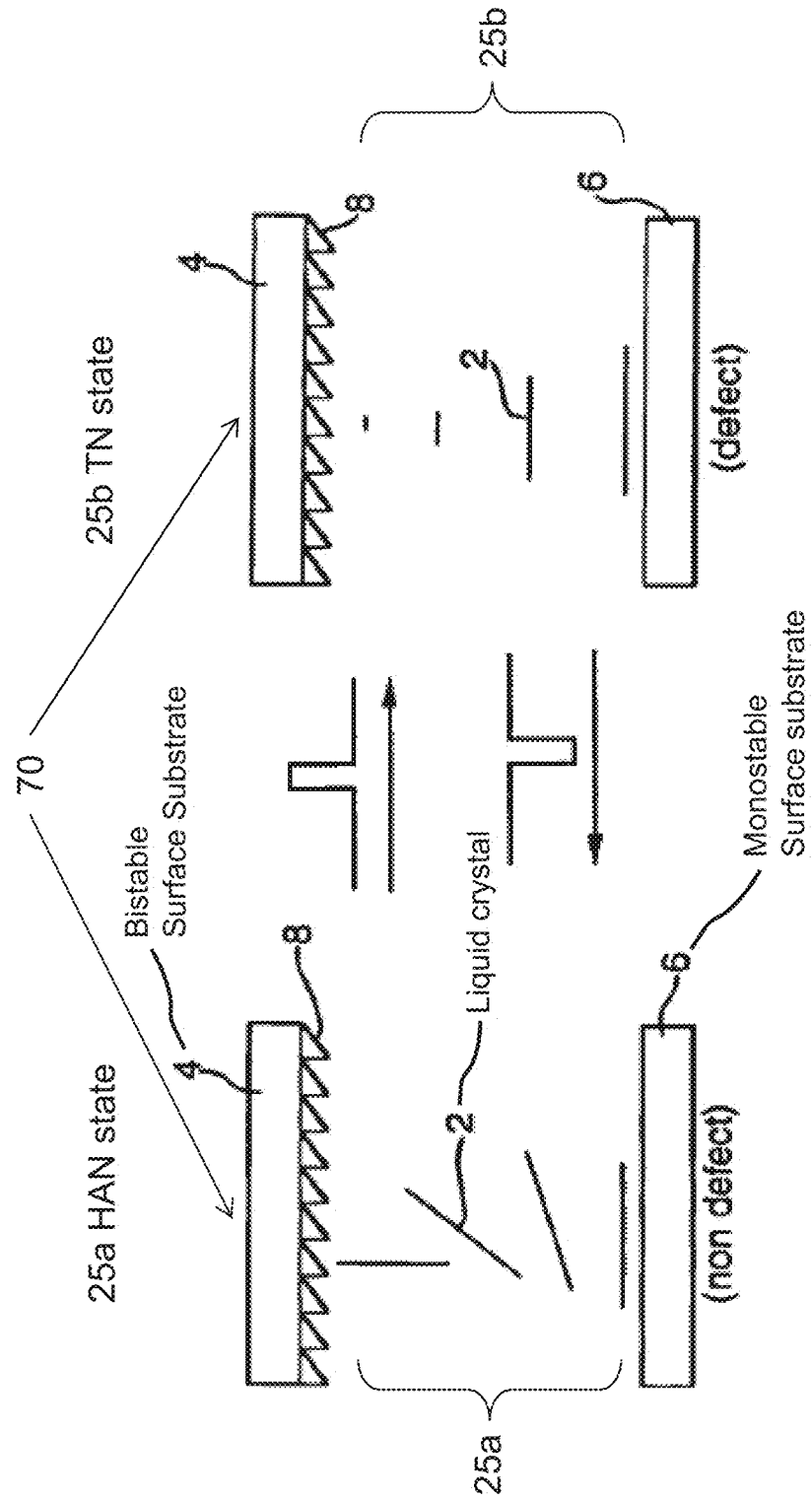
FIG. 3: A conventional design and operation of a particular zenithal bistable liquid crystal display (ZBD)

With reference to FIG. 3 (conventional art), a ZBD 70 has a monostable surface substrate 6 upon which has an LC alignment layer (not shown), such as polyimide, that may provide a monostable, low surface tilt of the LC 2 molecules. With reference to FIG. 3, the ZBD has a bistable surface substrate 4 upon which has a bistable LC alignment layer 8 that provides a LC bistable surface. The bistable LC alignment layer 8 may be a grating (as shown in FIG. 3) that may provide the LC bistable surface. The monostable surface substrate 6 with monostable LC alignment layer (not shown) may be a first substrate 24 in the display system 40 while the bistable surface substrate 4 with the bistable LC alignment layer 8 may be the second substrate 26 in the display system 40. The monostable surface substrate 6 with monostable LC alignment layer (not shown) may be the second substrate 26 in the display system 40 while the bistable surface substrate 4 with the bistable LC alignment layer may be the first substrate 24 in the display system 40. The alignment direction of the ZBD monostable surface 6 may be arranged parallel to, perpendicular to or at a pre-determined angle to, an edge of the second image display 20. The alignment direction of the ZBD monostable surface 6 may be patterned such that for at least a first spatial region of the second image display 20 the monostable alignment direction is aligned at a first angle to an edge of the second image display 20 and for at least a second spatial region of the second image display 20 the monostable alignment direction is aligned at a second angle to said edge of the second display 20. The first and second monostable alignment directions of the patterning may be perpendicular to each other. The first and second monostable alignment directions may be arranged +45° and −45° respectively relative to a given edge of the second image display 20. In all cases described above, the grating alignment direction of the ZBD 70 is arranged relative to the monostable surface alignment direction to enable the correct operation of the ZBD device. Consequently, if the monostable alignment direction is patterned then the grating direction must also be patterned appropriately.

A first, energetically stable configuration of the LC molecules in a given ZBD 70 is a Hybrid Aligned Nematic state (HAN state) 25*a* (FIG. 3). In the HAN state 25*a*, the bistable LC alignment layer 8 causes the LC molecules to adopt a high tilt in proximity to the bistable LC alignment layer 8. A second, energetically stable configuration of the LC molecules in the given ZBD 70 is a Twisted Nematic state (TN state) 25*b*. In the TN state 25*b*, the bistable surface causes the LC molecules to adopt a low tilt in proximity to the bistable LC alignment layer 8. Switching between the HAN state 25*a* and the TN state 25*b* is achieved via application of a suitable waveform as shown schematically in FIG. 3 and described in detail in the literature. The polarity of the pulse is a key factor as the whether the HAN state 25*a* or the TN state 25*b* is selected. By employing a matrix array of electrodes in a standard fashion, pixels within a ZBD 70 may be individually switched between the HAN state 25*a* and the TN state 25*b*. Driving a ZBD 70 does not require the use of opaque TFTs. The use of opaque TFTs or any other substantially opaque feature within the ZBD 70 would create a Moiré effect with the image presented by the first image display 10 that would significantly detract from the appearance of the display system 40.

Figure 16:
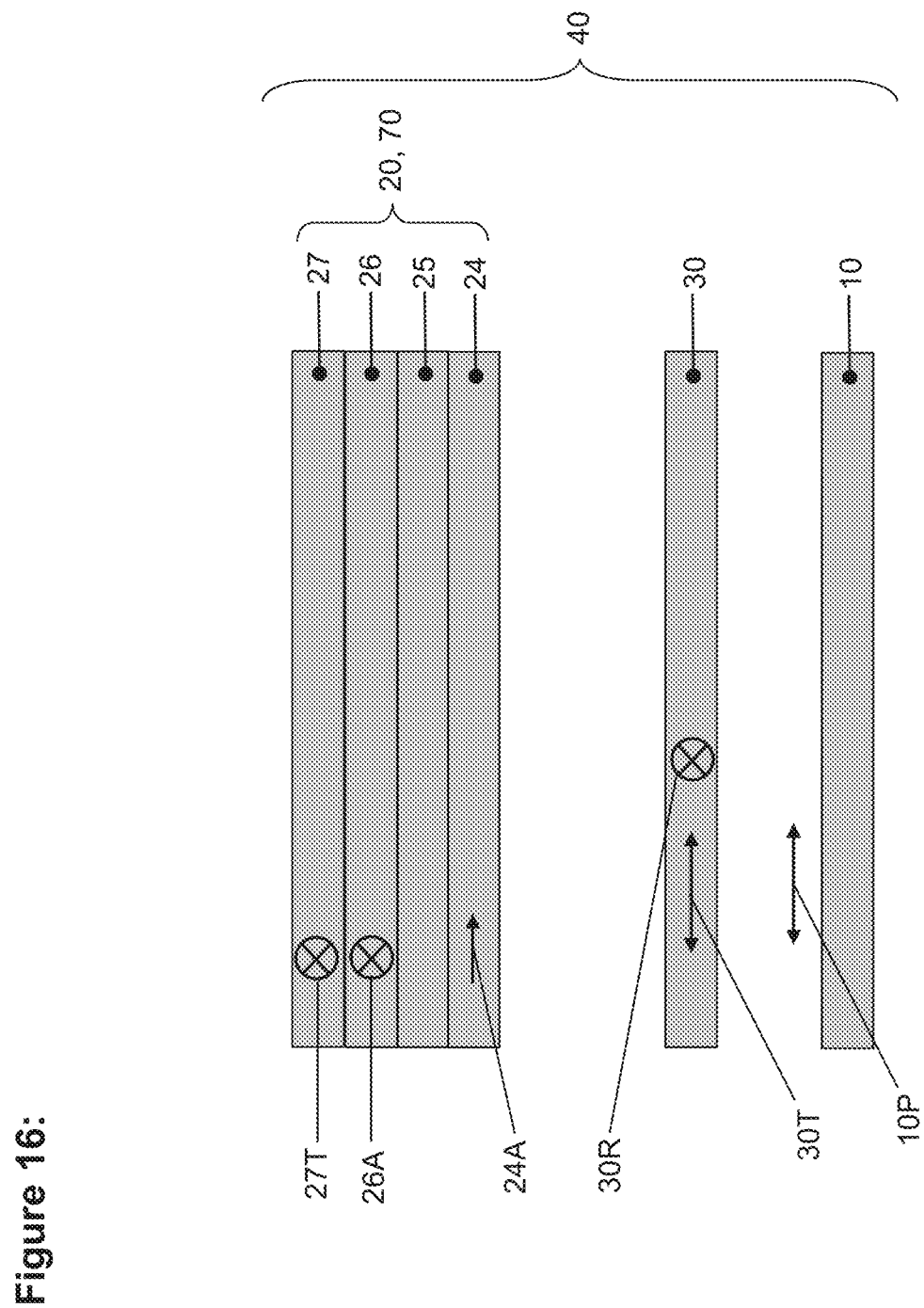
FIG. 16: Optical arrangement of a first image display and a second image display, exploded side view

With reference to FIG. 16, a specific example of the optical components arranged to realise a display system 40 that enables the first, second, third, fourth, fifth and sixth display functions will now be described. It will be appreciated that FIG. 16 is a partially exploded view of the display system 40; the first image display 10, the reflective polariser 30 and the second image display 20 are arranged and preferably adhered together in optical contact with each other (to minimise unwanted reflections) in order to form the display system 40.

The first image display 10 emits linearly polarised light 10P that is polarised parallel to the transmission axis 30T of the reflective polariser 30. The orientation of the linearly polarised light 10P may be intrinsic or extrinsic to the design of the first image display 10. A retardation film (e.g., 19*a*, 19*b* or 19*c* (not shown)) may be a half-wave retardation film and employed to rotate the linear polarisation state of light exiting the first image display 10 so that the light incident on the reflective polariser 30 from the first image display 10 is polarised parallel to the transmission axis 30T of the reflective polariser 30. The second image display 20 is a Zenithal Bistable Liquid Crystal Display (ZBD) 70. With the ZBD 70 switched into the TN state 25*b*, the liquid crystal alignment direction 24A, associated with the first substrate 24, is arranged parallel to the transmission axis 30T of the reflective polariser 30. In the TN state 25*b*, the liquid crystal alignment direction 26A, associated with the second substrate 26, is arranged perpendicular to the LC alignment direction 24A. The transmission axis 27T of the polariser 27 is arranged perpendicular to the reflective polariser transmission axis 30T. The reflection axis 30R of the reflective polariser 30 may be arranged parallel to the transmission axis 27T of the polariser 27.

Figure 17:
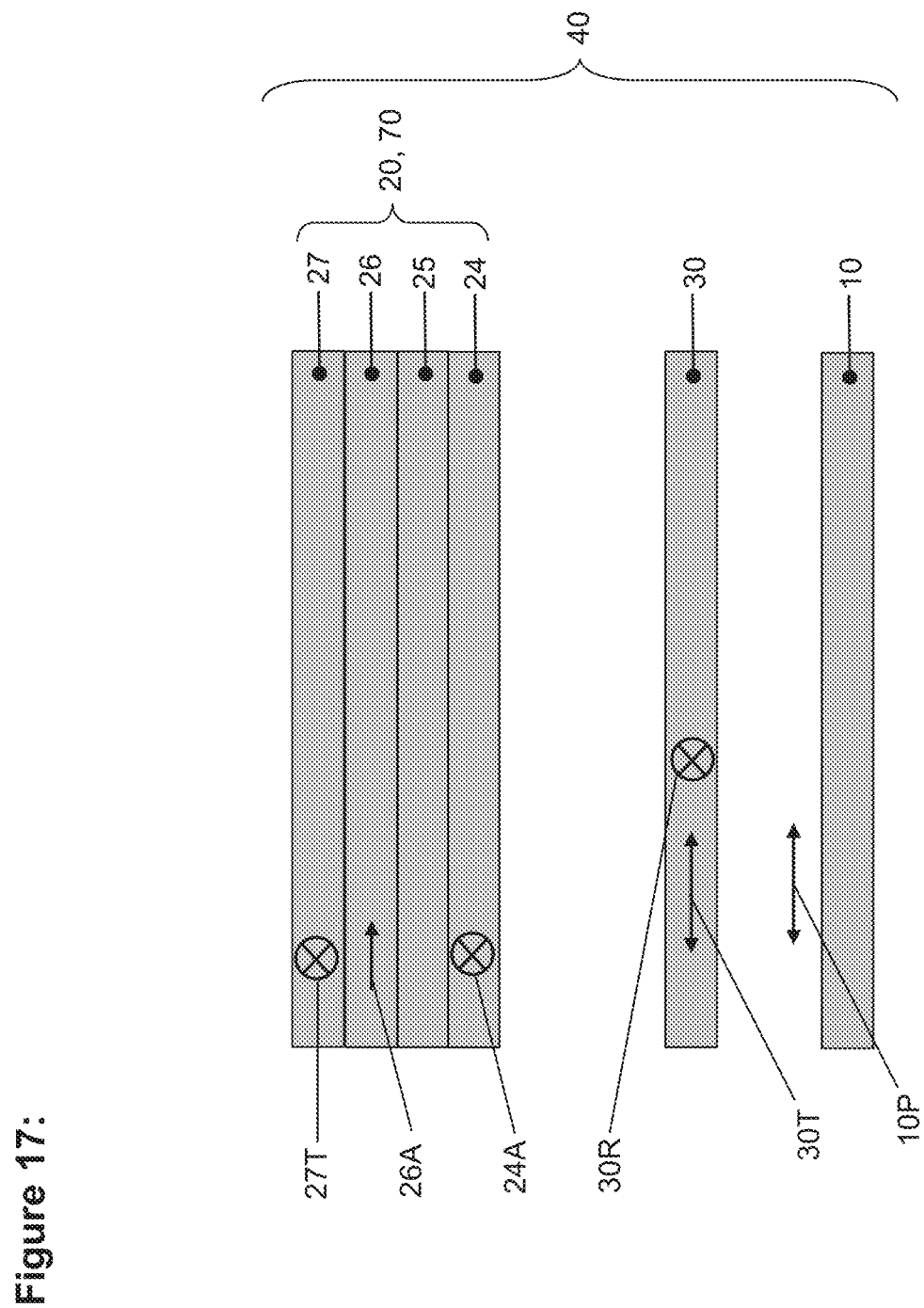
FIG. 17: Optical arrangement of a first image display and a second image display, exploded side view

Alternatively, with reference to FIG. 17, with the ZBD 70 switched into the TN state 25*b*, the liquid crystal alignment direction 24A associated with the lowermost substrate 24 may be arranged perpendicular to the transmission direction 30T of the reflective polariser 30. In the TN state 25*b*, the liquid crystal alignment direction 26A associated with the uppermost substrate 26 is arranged perpendicular to the alignment direction 24A. The transmission axis 27T of the polariser 27 is arranged perpendicular to the reflective polariser transmission axis 30T.

With reference to FIG. 16 and FIG. 17, the optical operation of the display system 40 that enables the first, second, third and fourth display functions will now be described.

The first display function of the display system 40 enables the viewer to view the first image display 10 as if the second image display 20 was not there. The first display function is achieved with the ZBD 70 switched into the TN state 25*b*. Linearly polarised light emitted from the image display 10 is transmitted substantially unattenuated through the reflective polariser 30 and enters the ZBD 70. Upon exiting the ZBD 70 the light is substantially linearly polarised and orientated substantially parallel to the transmission axis 27T of the polarising element 27 (i.e. the ZBD has substantially rotated the axis of linear polarisation through 90°).

A second display function of the display system 40 is a reflective mode that enables the viewer to view a reflected image. The second display function may be achieved with the ZBD 70 switched uniformly into the HAN state 25*a*. The first image display 10 is arranged to emit no light (i.e. the first image display 10 is turned off, or is in stand-by mode, or displays a black image). In order to reduce power consumption, it is preferable that the first image display 10 is turned off. Ambient light incident substantially parallel to the normal of the display system 40 (i.e. θ=±~15° from the display normal) undergoes substantially no polarisation change upon traversing the liquid crystal layer 25 of the ZBD 70 switched into the HAN state 25*a*. Consequently, this ambient light is reflected by the reflective polariser 30 and is substantially transmitted through the polariser 27 in order to yield a mirror function.

Alternatively, the second display function may be achieved with the ZBD 70 switched uniformly into the TN state 25*b* and a voltage is applied across the TN state 25*b* such that ambient light incident substantially parallel to the normal of the display system 40 (i.e. θ=±~15° from the display normal) undergoes substantially no polarisation change upon traversing the liquid crystal layer 25 of the ZBD 70. The first image display 10 is arranged to emit no light (i.e. the first image display 10 is turned off, or is in stand-by mode, or displays a black image). In order to reduce power consumption, it is preferable that the first image display 10 is turned off. Consequently, ambient light (θ=±~15° from the display normal) is reflected by the reflective polariser 30 and is substantially transmitted through the polariser 27 in order to yield a mirror function. By varying the voltage across the TN state 25b, the reflectivity of the mirror may be adjusted. By increasing the voltage across the TN State 25b, the reflectivity of the mirror may be increased.

The advantage of using the HAN state 25a to achieve the mirror function is that no power is consumed while the LC layer is uniformly switched into the HAN state 25a (i.e. no voltage is required to maintain the mirror function). The advantage of using the TN state 25b to achieve the mirror function is that a mirror of variable reflectivity can be achieved (i.e. a voltage is required to maintain the mirror function and magnitude of the voltage is related to the reflectivity of the mirror function).

The third display function of the display system 40 is a reflective mode that can convey information to the viewer. The first image display 10 is arranged to emit no light (i.e. the first image display 10 is turned off or is in stand-by mode or displays a black image). In order to reduce power consumption, it is preferable that the first image display 10 is turned off. The information is conveyed to the viewer by switching pixels of the ZBD 70 into either the HAN state 25a or the TN state 25b. As described previously, with the ZBD 70 switched into the HAN state 25a, ambient light is substantially reflected from the display system 40. With the ZBD 70 switched into the TN state 25b, ambient light is substantially transmitted through the reflective polariser 30 and is absorbed by the optical components of the first image display 10. Consequently, an image (and hence information) can be conveyed to the viewer via a combination of reflective pixels and black pixels. The third display function is essentially a mirror that can be patterned at the resolution of a pixel via an addressing scheme.

The fourth display function of the display system 40 is a reflective mode that can convey information to the viewer in an eye-catching and attractive fashion by addressing images to both the first image display 10 and the second image display 20. As described previously, with the ZBD 70 switched into the HAN state 25a, ambient light is substantially reflected from the display system 40. With the ZBD 70 switched into the TN state 25b, ambient light is substantially transmitted through the reflective polariser 30 and is absorbed by the optical components of the first image display 10. As previously described, the viewer can view the first image display 10 as if the second image display 20 was not there (i.e. the ZBD 70 appears substantially transparent) when the ZBD 70 is switched into the TN state 25b. With the ZBD 70 switched into the TN state 25b, the pixels of the first image display 10 are clearly revealed to the viewer. With the ZBD 70 switched into the HAN state 25a, a small proportion of light from the first image display 10 may be transmitted through the second display 20 to be observed by the viewer. This effect may be used to add to the attractiveness of the display mode. With the ZBD 70 switched into the TN state 25b, the proportion of light transmitted through the second display 20 from the first image display 10 and the proportion of light reflected from the reflective polariser 30 may adjusted via application of a voltage across the TN state 25b. This effect may also be used to add to the attractiveness of the display mode. Consequently, information can be conveyed to the viewer via a combination of reflective pixels (from ZBD 70) and pixels from the first image display. The reflective pixels of the ZBD 70 and the pixels from the first image display 10 may be laterally separated and/or laterally coincident (i.e. the viewer may perceive the reflective pixels and the pixels from the first image display 10 to emanate from different spatial locations from the display system 40 and/or the viewer may perceive the reflective pixels and the pixels from the first image display to emanate from the same spatial location from the display system 40)

The fifth display function of the display system 40 enables the viewer to view 3D images. Interlaced 3D images are addressed to the first image display 10 in a standard fashion while the second image display 20 directs the stereoscopic images to the corresponding eyes of the viewer. With reference to FIG. 10 and FIG. 15, a specific example of electrode design to enable the viewing of autostereoscopic 3D images will now be described. With the ZBD 70 switched into the TN state 25b, the thickness (d) of the LC layer 25 and the birefringence (an) of the LC layer 25 may be chosen such that a Gooch-Tarry $1^{st}$ minimum or $2^{nd}$ minimum TN condition etc. is satisfied for light of wavelength λ (i.e. $\sqrt{3}=2d\Delta n/\lambda$ for a $1^{st}$ minimum TN condition and $\sqrt{15}=2d\Delta n/\lambda$ for a $2^{nd}$ minimum TN condition etc.). With reference to FIG. 10, a parallax barrier comprised of transmissive and non-transmissive regions can be formed by switching the ZBD 70 into the HAN state 25a using electrodes 26e2 and by switching the ZBD 70 into the TN state 25b using electrodes 26e1. In cooperation with the polarising elements (27, 30, 19) the HAN state 25a forms a periodic array of non-transmissive regions that prevents light from the first image display 10 reaching the viewer's eyes. In cooperation with the polarising elements (27, 30, 19) the TN state 25a forms a periodic array of transmissive regions that enabling light from the first image display to reach the viewer's eyes. For a 2-View 3D system as shown in FIG. 15, the pitch or periodicity $P_e$ of the electrodes 26e that form the parallax barrier is given by 26ew1+2*26eg+26ew2 and is substantially equal to twice the pixel pitch or periodicity $P_e$ of first image display 10 (i.e. 26ew1+2*26eg+26ew2=2*$p_i$). In order to correct for view point, the exact pitch or periodicity $P_e$ of the electrodes that form the parallax barrier is arranged such that $P_e$=26ew1+2*26eg+26ew2=(2*$P_i$)/(1+ s/e), where e is the interocular distance, $P_i$ is the pixel pitch or periodicity $p_i$ of the first image display 10 and s is the distance between the liquid crystal layer 15 or organic electroluminescent layer 61 of the first image display 10 and the liquid crystal layer 25 of the second image display 20. The width of the TN state 25b (transmissive region) may be arranged to be ~35% of the pitch or periodicity $P_e$. The vertical arrangement of electrodes 26e enables the viewing of 3D images in a horizontal orientation.

Figure 18:
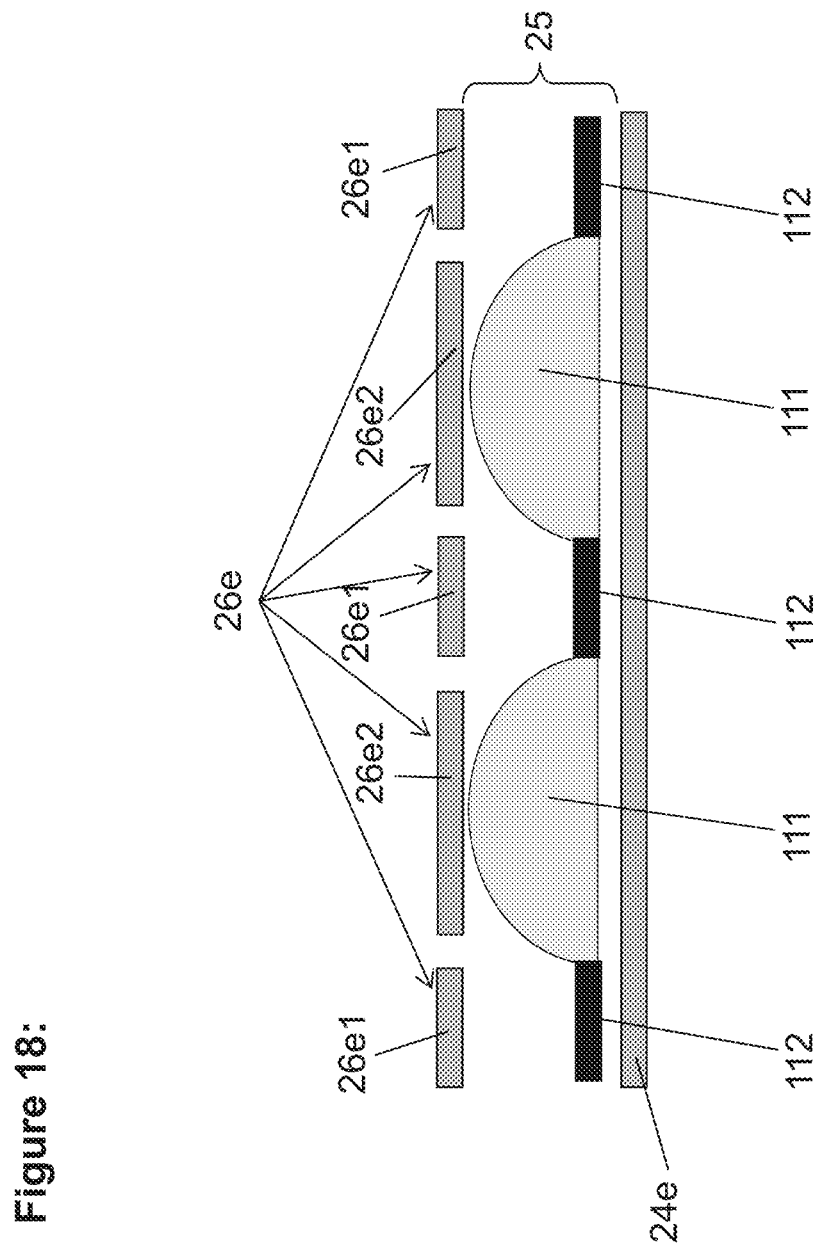
FIG. 18: Optic comprised of lenses and parallax barriers

Alternatively, the fifth display function may be achieved by using the ZBD 70 to form a periodic array of lenses and parallax barriers such that the parallax barriers (non-transmissive to the first image display) are disposed between each lens element. With reference to FIG. 18, the width of a parallax barrier region 112 (non-transmissive to the first image display) is primarily governed by the width of the electrode 26e that is used to switch the LC layer 25 into the HAN state 25a, for example, electrode 26e1 (the inter-electrode gap 26eg has been ignored). The width of a lens element 111 (transmissive to the first image display) is primarily governed by the width of the electrode 26e that is used to switch the LC layer 25 into the TN state 25b, for example, 26e2 (the inter-electrode gap 26eg has been ignored). A voltage is then applied to electrode 26e1 such that a fringing electric field forms between electrodes 26e1 and 24e. This fringing electric field forms a lens element 111, known as a Graded Reflective Index (GRIN), situated substantially between successive electrodes 26e1 and situated substantially underneath electrode 26e2. The focal length f (not shown), of the lens element 111, may approximately satisfy the equation f=$a^2$/8Δnd, where a (not shown) is the lens aperture (lens aperture ~ width of electrode 26e2), Δn is the birefringence of the LC and d is the thickness of the LC layer 25. Preferable 3D imaging performance occurs when f/n~s, where n is the average refractive index of the material between the liquid crystal layer 15 or organic electroluminescent layer 61 of the first image display 10 and the liquid crystal layer 25 of the second image display 20 and s is the distance between the liquid crystal layer 15 or organic electroluminescent layer 61 of the first image display 10 and the liquid crystal layer 25 of the second image display 20. Preferable 3D imaging performance also occurs when the condition 3<a/d<9 is satisfied. A worked example of the electrode design will now be performed. If the first image display has a pixel pitch or periodicity $P_i$ of 100 μm, then $P_e$=26ew1+2*26eg+26ew2=200 μm. For a 3D viewing distance of ~300 mm, then s~700 μm. Therefore f~470 μm and a~120 μm and Δnd~3.8 μm. If Δn is chosen to be ~0.2, then d~20 μm. Therefore if we assume 26eg~20 μm then the electrode 26e1, 26e2 widths of 26ew1~45 μm and 26ew2~115 μm can be used to form an array of lens and parallax barrier elements for use in the viewing of 3D images.

Alternatively, the ZBD 70 can be used to form a periodic array of lenses and parallax barriers by switching the LC layer 25 uniformly into the TN state 25b. A voltage is then applied to electrode 26e1 such that a fringing electric field forms between electrodes 26e1 and 24e as previously described to create the GRIN lens element 111 that is situated substantially between successive electrodes 26e1 and situated substantially underneath electrode 26e2.

By varying the widths of the electrodes 26e1 and 26e2, the proportions of the parallax barrier regions and the lens regions may be controlled to suit the specific requirements of the display system 40. For example, if a display system 40 with a high brightness 3D mode is required, then the width (26ew1 for example) of the electrode (26e1 for example) that forms the parallax barrier can be minimized. However, if a display system 40 is required that has reflective pixels of equal size, then 26e1 and 26e2 can be designed to be the same width.

The width of 26eg may be chosen to optimise the 3D imaging performance. The width of 26eg may be chosen to optimise the amount of reflected light as described by the $2^{nd}$ and $3^{rd}$ display functions.

With regard to the 3D function (o display function) the advantage of the parallax barrier only design over the lens+parallax barrier design is that a thinner LC layer 25 is possible. Another advantage of the lens+parallax barrier design over the parallax barrier only design is that a brighter 3D mode can be achieved since the ratio of transmissive to non-transmissive regions has been increased. If a display system 40 is required to have a 3D function and the reflective function in which the reflective pixels are of equal size, then the lens+parallax barrier design may be preferable since electrodes 26e1 and 26e2 can be arranged to be of equal width and still form good quality imaging optics for the 3D function.

Figure 23:
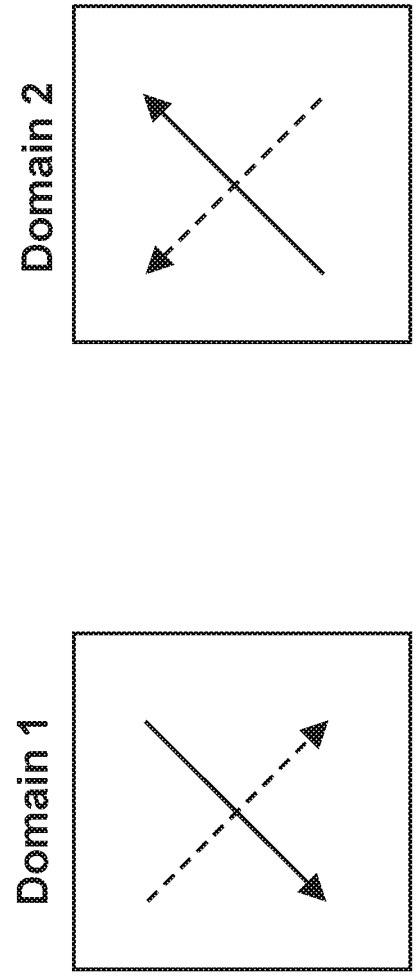
FIG. 23: Surface alignment directions of ZBD in TN mode for 2 different domains
Figure 24:
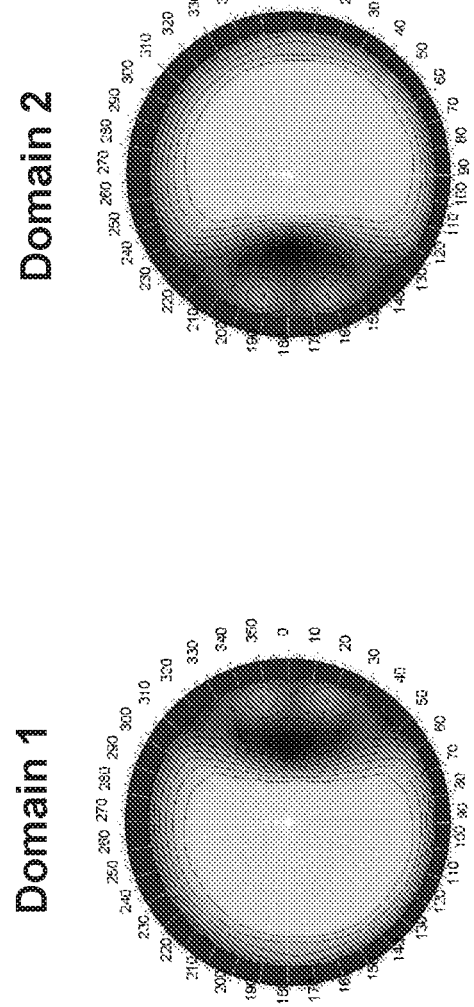
FIG. 24: Conoscopic luminance plot for ZBD in TN mode above LC switching threshold

The sixth display function of the display system 40 enables an image to be viewed on-axis while said image is obscured from off-axis viewing and therefore produces a private viewing mode. The image may comprise picture(s), text or a combination of picture(s) and text. With reference to FIG. 23, the sixth display function is achieved by patterning the alignment direction of the ZBD monostable surface 6 and patterning the alignment direction of the bistable surface 8 in at least two directions in order to create two distinct LC domains (Domain 1 and Domain 2). The monostable alignment direction may be patterned such that for at least a first spatial region (Domain 1) of the second image display 20 the monostable alignment direction is aligned at a first angle to an edge of the second image display 20 and for at least a second spatial region of the second image display 20 the monostable alignment direction is aligned at a second angle to said edge of the second display 20. The first and second monostable alignment directions of the patterning may be perpendicular to each other. It is preferable that the monostable surface is be patterned such that Domain 1 is at +45° to an edge of the second image display 20 and Domain 2 is at −45° to said edge of the second image display 20. In all cases described above, the alignment direction of the bistable surface 8 is arranged relative to the monostable surface alignment direction to enable the correct operation of the ZBD device. It is preferable that the alignment direction of the bistable surface is arranged relative to the monostable alignment direction such that the same handedness of LC twist is maintained throughout the second image display 20 when the ZBD device 70 is switched into the TN mode. The sixth display function is achieved with the ZBD 70 switched into the TN state 25b and a voltage is applied across ZBD such that the LC molecules are re-orientated, but still remain in the TN state 25b (i.e. the ZBD device is not switched into the HAN state 25a). The voltage that is applied across the LC layer is sufficient to partially reorient the LC molecules so that the majority of the LC molecules have a component aligned parallel to the monstable surface normal. The voltage that must be applied across the LC layer is therefore above the TN threshold voltage but below TN saturation voltage and below the voltage that switches the ZBD from the TN state 25b to the HAN state 25a. If the TN layer were being used as an image display, the voltage applied across the LC layer would therefore correspond to a mid-grey level. With reference to FIG. 24, the optical effect of such a voltage to the TN state 25b is that Domain 1 and Domain 2 have the same luminance on-axis. However, Domain 1 and Domain 2 have different luminance values for a range of off-axis angles. Consequently, for a first range of off-axis angles, Domain 1 will appear bright while Domain 2 will appear dark and for a second range of off-axis angles, Domain 1 will appear dark while Domain 2 will appear bright. The off-axis luminance contrast between Domain 1 and Domain 2 performs a privacy function by obscuring the information exhibited on the image display 10. It is preferable that Domain 1 and Domain 2 are the same size. Domain 1 and Domain 2 may be square. If square, Domain 1 and 2 may be 1 $mm^2$ to 10 $mm^2$ in size and preferably 3 $mm^2$ to 6 $mm^2$. The use of 2 distant LC domains as described above enables a privacy function to the display user's left and right (i.e. information is obscured from person adjacent to the display user. The use of 4 distant LC domains enables a 360° off-axis privacy function.

Figure 19:
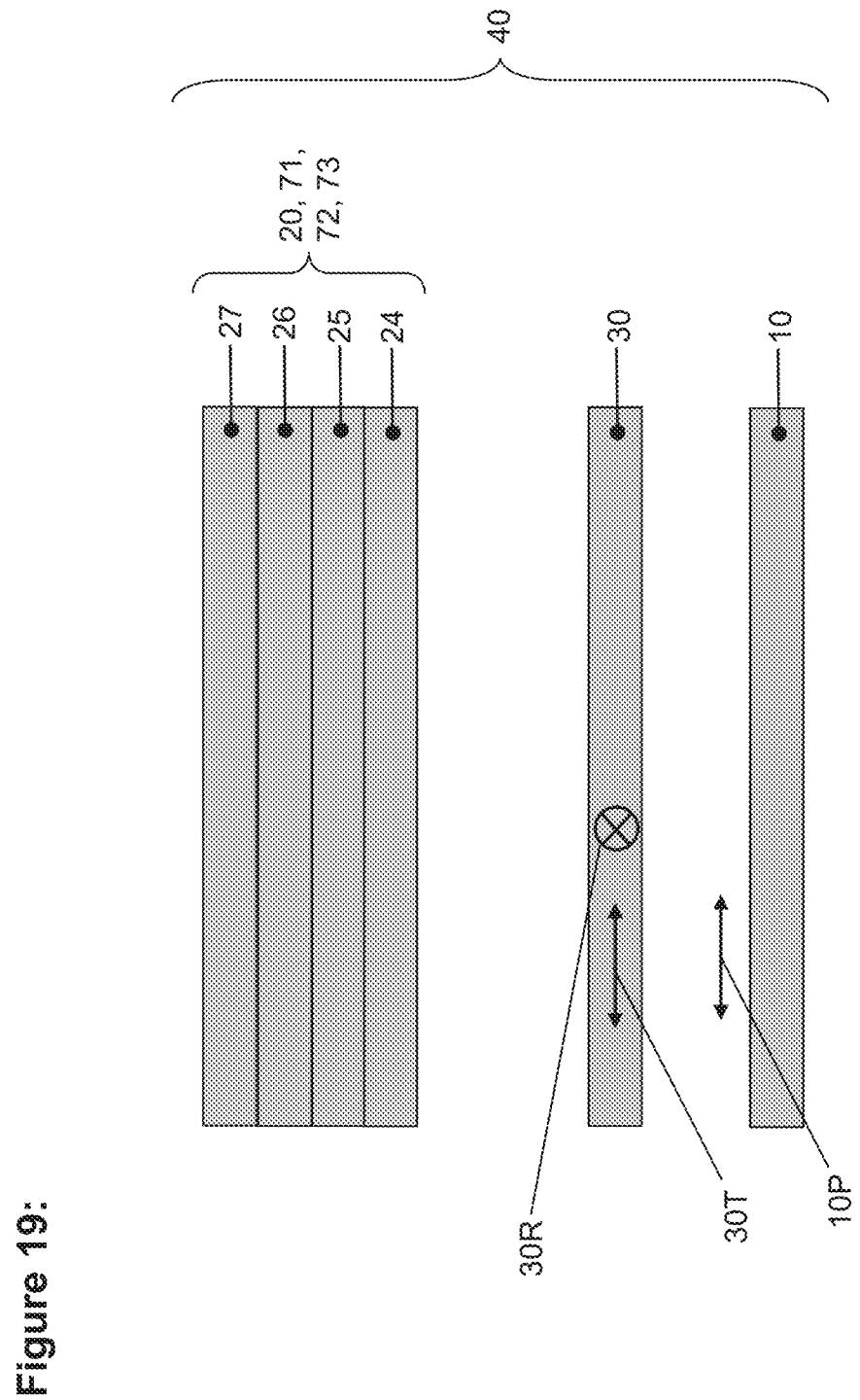
FIG. 19: Optical arrangement of a first image display and a second image display, exploded side view

With reference to FIG. 19, a further embodiment uses a Super Twisted Nematic Liquid Crystal Display (STN) 71 as the second image display 20 and a reflective polariser 30 that has specular reflection properties. The operation of the STN has been disclosed extensively in the literature. Driving an STN 71 does not require the use of opaque TFTs. The use of opaque TFTs or any other substantially opaque feature within the STN 71 would create a Moiré effect with the first image display 10 that would significantly detract from the appearance of the display system 40. In essence, the STN has two LC configurations that are of interest. A first LC configuration (applied voltage, V, across the STN layer=0V) has a first amount of phase retardation and a second LC configuration (applied voltage, V, across the STN layer >~2V) that has a second amount of phase retardation. The polarisation state of light exiting the STN 71 after traversing the first LC configuration is substantially orthogonal to the polarisation state of light exiting the STN 71 after traversing the second LC configuration.

The first display function of the display system 40 enables the viewer to view the first image display 10 as if the second image display 20 was not there. This may be achieved with the STN 71 operating in the first LC configuration (0V). Light emitted from the first image display traverses the LC layer 25 and is substantially transmitted through the polariser 27.

The second display function of the display system 40 is a reflective mode that enables the viewer to view a reflected image. This may be achieved with the STN operating in the second LC configuration (V>~2V). The first image display 10 is arranged to emit no light (i.e. the first image display 10 is turned off, or is in stand-by mode, or displays a black image). In order to reduce power consumption, it is preferable that the first image display 10 is turned off. Ambient light incident substantially parallel to the normal of the display system 40 (i.e. θ=±~15° from the display normal) is reflected by the reflective polariser 30 and is substantially transmitted through the polariser 27 in order to yield a mirror function.

The third display function of the display system 40 is a reflective mode that can convey information to the viewer. The first image display 10 is arranged to emit no light (i.e. the first image display 10 is turned off or is in stand-by mode or displays a black image). In order to reduce power consumption, it is preferable that the first image display 10 is turned off. The information is conveyed to the viewer by switching pixels of the STN 71 into either the first LC configuration (V=0V) or the second LC configuration (V>~2V). With the STN 71 switched into the first LC configuration (V=0V), ambient light is substantially transmitted through the reflective polariser 30 and is absorbed by the optical components of the first image display 10. With the STN 71 switched into the second LC configuration (V>~2V), ambient light is reflected from the reflective polariser 30 and is substantially transmitted back through the polariser 27 in order to yield a mirror function. Consequently, an image (and hence information) can be conveyed to the viewer via a combination of reflective pixels and black pixels.

The fourth display function of the display system 40 is a reflective mode that can convey information to the viewer in an eye-catching and attractive fashion by addressing images to both the first image display 10 and the second image display 20. As described previously, with the STN 71 switched into the second LC configuration (V>~2V), ambient light is substantially reflected from the display system 40. With the STN 71 switched into the first LC configuration (V=0V), ambient light is substantially transmitted through the reflective polariser 30 and is absorbed by the optical components of the first image display 10. As previously described, the viewer can view the first image display 10 as if the second image display 20 was not there (i.e. the STN 71 appears substantially transparent) when the STN 71 is switched into the first LC configuration (V=0V). Consequently, information can be conveyed to the viewer via a combination of reflective pixels (from the STN 71) and pixels from the first image display 10.

The fifth display function of the display system 40 enables the viewer to view 3D images. Interlaced 3D images are addressed to the first image display 10 in a standard fashion while the second image display 20 directs the stereoscopic images to the corresponding eyes of the viewer. With reference to FIG. 10 and FIG. 15, a specific example of electrode design to enable the viewing of autostereoscopic 3D images will now be described. Electrodes 26e2 are used to switch the STN 71 into the second LC configuration (V>~2V). Light from the first image display 10 that traverses the second substrate layer 26, when in the second LC configuration (V>~2V), is substantially absorbed by the polariser 27. Electrodes 26e1 are used to switch the STN 71 into the first LC configuration (V=0V). Light from the first image display 10 that traverses the first LC configuration (V=0V) is substantially transmitted by the polariser 27. Therefore the electrodes 26e1 and 26e2 in conjunction with the STN 71 layer and polarising elements create a parallax barrier for the viewing of 3D images displayed on the first image display 10.

With continued reference to FIG. 19, a further embodiment uses a Bistable Twisted Nematic Liquid Crystal Display (BTN) 72 as the second image display 20 and a reflective polariser 30 that has specular reflection properties. The operation of the BTN 72 has been disclosed extensively in the literature. Driving a BTN 72 does not require the use of opaque TFTs. The use of opaque TFTs or any other substantially opaque feature within the BTN 72 would create a Moiré effect, with the image presented by the first image display 10, that would significantly detract from the appearance of the display system 40.

In essence, the BTN 72 has two LC configurations that are of interest. A first LC configuration (total LC twist angle=0°) has a first amount of retardation and a second LC configuration (total LC twist angle=360°) that has a second amount of retardation. The polarisation state of light exiting the BTN 72 after traversing the first LC configuration is substantially orthogonal to the polarisation state of light exiting the BTN 72 after traversing the second LC configuration.

The first display function of the display system 40 enables the viewer to view the first image display 10 as if the second image display 20 was not there. This may be achieved with the BTN 72 operating in the first LC configuration. Light emitted from the first image display traverses the LC layer 25 and is substantially transmitted through the polarising element 27.

The second display function of the display system 40 is a reflective mode that enables the viewer to view a reflected image. This may be achieved with the BTN 72 operating in the second LC configuration. The first image display 10 is arranged to emit no light (i.e. the first image display 10 is turned off, or is in stand-by mode, or displays a black image). In order to reduce power consumption, it is preferable that the first image display 10 is turned off. Ambient light incident substantially parallel to the normal of the Display System 40 (i.e. θ=±~15° from the display normal) is reflected by the reflective polariser 30 and is substantially transmitted through the polariser 27 in order to yield a mirror function.

The third display function of the display system 40 is a reflective mode that can convey information to the viewer. The first image display 10 is arranged to emit no light (i.e. the first image display is turned off or is in stand-by mode or displays a black image). In order to reduce power consumption, it is preferable that the first image display 10 is turned off. The information is conveyed to the viewer by switching pixels of the BTN 72 into either the first LC configuration or the second LC configuration. With the BTN 72 switched into the first LC configuration, ambient light is substantially transmitted through the reflective polariser 30 and is absorbed by the optical components of the first image display 10. With the BTN 72 switched into the second LC configuration, ambient light is reflected from the reflective polariser 30 and is substantially transmitted back through the polariser 27 in order to yield a mirror function. Consequently, an image (and hence information) can be conveyed to the viewer via a combination of reflective pixels and black pixels.

The fourth display function of the display system 40 is a reflective mode that can convey information to the viewer in an eye-catching and attractive fashion by addressing images to both the first image display 10 and the second image display 20. As described previously, with the BTN 72 switched into the second LC configuration, ambient light is substantially reflected from the display system 40. With the BTN 72 switched into the first LC configuration, ambient light is substantially transmitted through the reflective polariser 30 and is absorbed by the optical components of the first image display 10. As previously described, the viewer can view the first image display 10 as if the second image display 20 was not there (i.e. the BTN 72 appears substantially transparent) when the BTN 72 is switched into the first LC configuration. Consequently, information can be conveyed to the viewer via a combination of reflective pixels (from the BTN 72) and pixels from the first image display 10.

The fifth display function of the Display System 40 enables the viewer to view 3D images. Interlaced 3D images are addressed to the first image display 10 in a standard fashion while the second image display 20 directs the stereoscopic images to the corresponding eyes of the viewer. With reference to FIG. 10 and FIG. 15, a specific example of electrode design to enable the viewing of autostereoscopic 3D images will now be described. Electrodes 26e2 are used to switch the BTN 72 into the second LC configuration. Light from the first image display 10 that traverses the second LC configuration is substantially absorbed by the polariser 27. Electrodes 26e1 are used to switch the BTN 72 into the first LC configuration. Light from the first image display 10 that traverses the first LC configuration is substantially transmitted by the polariser 27. Therefore the electrodes 26e1 and 26e2 in conjunction with the BTN 72 layer and polarising elements create a parallax barrier for the viewing of 3D images displayed on the first image display 10.

Again with reference to FIG. 19, a further embodiment uses a Ferroelectric Liquid Crystal Display (FLC) 73 as the second image display 20 and a reflective polariser 30 that has specular reflection properties. The operation of the FLC has been disclosed extensively in the literature. Driving a FLC does not require the use of opaque TFTs. The use of opaque TFTs or any other substantially opaque feature within the FLC 73 would create a Moiré effect, with the image presented by the first image display 10, that would significantly detract from the appearance of the display system 40. In essence, the FLC 73 has two LC configurations that are of interest. A first LC configuration has a first amount of retardation (LC alignment is substantially parallel to the input linear polarisation direction) and a second LC configuration that has a second amount of retardation (LC alignment is substantially 45° to the input linear polarisation direction). The polarisation state of light exiting the FLC 73 after traversing the first LC configuration is substantially orthogonal to the polarisation state of light exiting the FLC 73 after traversing the second LC configuration.

The first display function of the display system 40 enables the viewer to view the first image display 10 as if the second image display FLC 73 was not there. This may be achieved with the FLC 73 operating in the first LC configuration. Light emitted from the first image display traverses the LC layer 25 and is substantially transmitted through the polarising element 27.

The second display function of the display system 40 is a reflective mode that enables the viewer to view a reflected image. This may be achieved with the FLC 73 operating in the second LC configuration. The first image display 10 is arranged to emit no light (i.e. the first image display is turned off, or is in stand-by mode, or displays a black image). In order to reduce power consumption, it is preferable that the first image display 10 is turned off. Ambient light incident substantially parallel to the normal of the Display System 40 (i.e. $\theta = \pm \sim 15°$ from the display normal) is reflected by the reflective polariser 30 and is substantially transmitted through the polariser 27 in order to yield a mirror function.

The third display function of the display system 40 is a reflective mode that can convey information to the viewer. The first image display 10 is arranged to emit no light (i.e. the first image display 10 is turned off or is in stand-by mode or displays a black image). In order to reduce power consumption, it is preferable that the first image display 10 is turned off. The information is conveyed to the viewer by switching pixels of the FLC 73 into either the first LC configuration or the second LC configuration. With the FLC 73 switched into the first LC configuration, ambient light is substantially transmitted through the reflective polariser 30 and is absorbed by the optical components of the first image display 10. With the FLC 73 switched into the second LC configuration, ambient light is reflected from the reflective polariser 30 and is substantially transmitted back through the polariser 27 in order to yield a mirror function. Consequently, an image (and hence information) can be conveyed to the viewer via a combination of reflective pixels and black pixels.

The fourth display function of the display system 40 is a reflective mode that can convey information to the viewer in an eye-catching and attractive fashion by addressing images to both the first image display 10 and the second image display 20. As described previously, with the FLC 73 switched into the second LC configuration, ambient light is substantially reflected from the display system 40. With the FLC 73 switched into the first LC configuration, ambient light is substantially transmitted through the reflective polariser 30 and is absorbed by the optical components of the first image display 10. As previously described, the viewer can view the first image display 10 as if the second image display 20 was not there (i.e. the FLC 73 appears substantially transparent) when the FLC 73 is switched into the first LC configuration. Consequently, information can be conveyed to the viewer via a combination of reflective pixels (from the FLC 73) and pixels from the first image display 10.

The fifth display function of the display system 40 enables the viewer to view 3D images. Interlaced 3D images are addressed to the first image display 10 in a standard fashion while the second image display 20 directs the stereoscopic images to the corresponding eyes of the viewer. With reference to FIG. 10 and FIG. 15, a specific example of electrode design to enable the viewing of autostereoscopic 3D images will now be described. Electrodes 26e2 are used to switch the FLC 73 into the second LC configuration.

Light from the first image display 10 that traverses the second LC configuration is substantially absorbed by the polariser 27. Electrodes 26e1 are used to switch the FLC 73 into the first LC configuration. Light from the first image display 10 that traverses the first LC configuration is substantially transmitted by the polariser 27. Therefore the electrodes 26e1 and 26e2 in conjunction with the FLC 73 layer and polarising elements create a parallax barrier for the viewing of 3D images displayed on the first image display 10.

Figure 20:
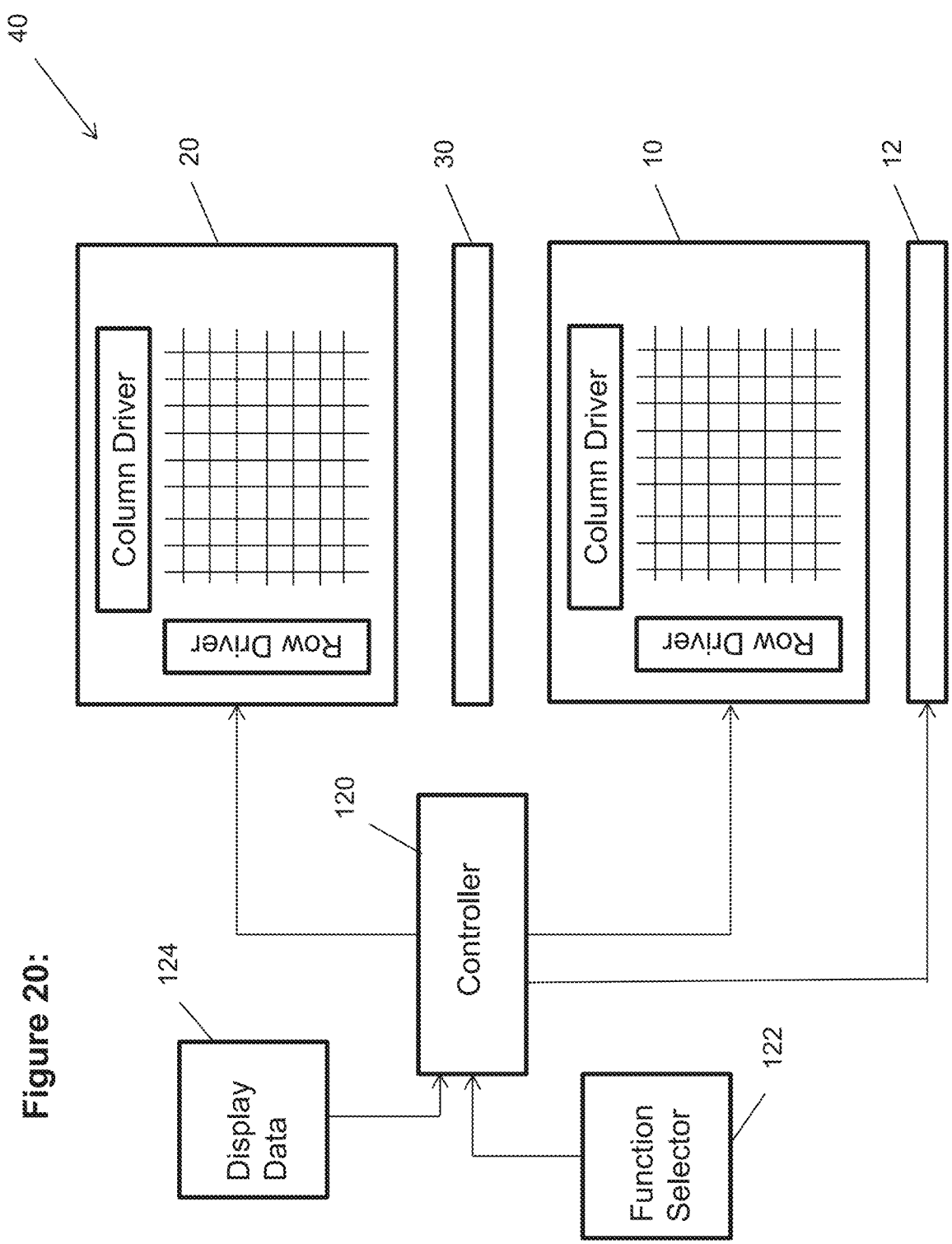
FIG. 20 is a detailed diagram of the display system

FIG. 20 is a block diagram illustrating the overall display system 40 including control electronics. Specifically, the system includes a controller 120 configured to provide the various control and data voltages described herein to the first image display 10 and second image display 20. The controller 120 may be a digital processor programmed in accordance with conventional programming techniques, and thus further detail has been omitted for sake of brevity. A function selector 122 is included which may be a user selected input device (e.g., a keypad, touch screen, etc.), application based selector (selected automatically by the particular application utilizing the display system 40), etc., which enables selection between any of the first thru sixth display functions described herein which the display system 40 is intended to operate. Based on the selection received from the function selector 122, the controller 120 provides control and display data 124 to the first image display 10 and the second image display 20. The control and display data 124 are provided in accordance with conventional techniques to cause the respective row and column drivers of the displays to change the state of the respective pixels within the displays in order to display an image, provide reflective pixel(s), turn off the display, etc., as described herein. In the event the display system 40 includes a backlight 12, the controller 120 also serves to turn the backlight on and off as described herein.

FIG. 21 summarizes the operation of the display system 40. During operation according to the first display function, the controller 120 provides image data (e.g., text, video, etc.) to the first image display 10 so as to be displayed to the viewer. At the same time, the controller 120 provides data to the second image display 20 to uniformly switch the second image display 20 into the first, transparent state and reveals the information displayed by the first image display 10. In the event the display system 40 includes a backlight 12, the controller 120 turns the backlight 12 on or off, depending on, for example, user section, ambient light conditions, power saving mode, etc.

When operation is selected in accordance with the second display function, the controller 120 does not address an image to the first image display 10 (thereby rendering the first image display 10 inactive). At the same time, the controller 120 provides data to the second image display 20 to uniformly switch the second image display 20 into the second state so that the second image display in combination with the reflective polariser 30 acts like a plane mirror. If the first image display 10 has an associated backlight, then the controller 120 switches off the backlight 12.

In the event operation in accordance with the third display function is selected, again the controller 120 does not address an image to the first image display 10. At the same time, the controller 120 addresses image data to the second image display 20 to create a patterned mirror that may convey information, such as text or simple pictures to the viewer. If the first image display has an associated backlight 12, then the controller 120 switches off the backlight 12.

With selection of the fourth display function, the controller 120 again addresses an image to the second image display 20 to create a patterned mirror that may convey information, such as text or simple pictures, and addresses an image to the first image display 10 such that the visual effect of the patterned mirror produced by the second image display 20 is enhanced by the image displayed on the first image display 10. If the first image display 10 has an associated backlight 12, then the controller 120 may switch on or off the backlight 12.

With selection of the fifth display function, the controller 120 addresses an autostereoscopic three dimensional image to the first image display 10. At the same time, the controller 120 addresses an image to the second image display 20 that creates a parallax optic as described herein such that the three dimensional image on the first display is viewable to the viewer with the naked eye. If the first image display 10 has an associated backlight 12, then the controller 120 may switch on or off the backlight 12.

With selection of the sixth display function (the second image display 20 is a ZBD 70), the controller 120 addresses an image to the first image display 10. At the same time, the controller 120 addresses an image to the second image display 20 to be an obscuring optic as described herein such that the image of the first image display 10 is substantially viewable on-axis of the display system 40 but is substantially obscured from view off-axis and therefore produces a private viewing mode. If the first image display 10 has an associated backlight 12, then the controller 120 may switch on or off the backlight 12.

Figure 22F:
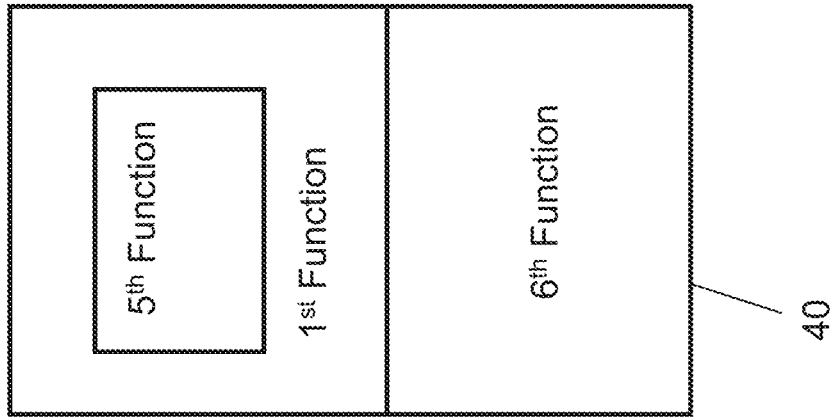
FIG. 22f: simultaneous employment of multiple display functions
Figure 22E:
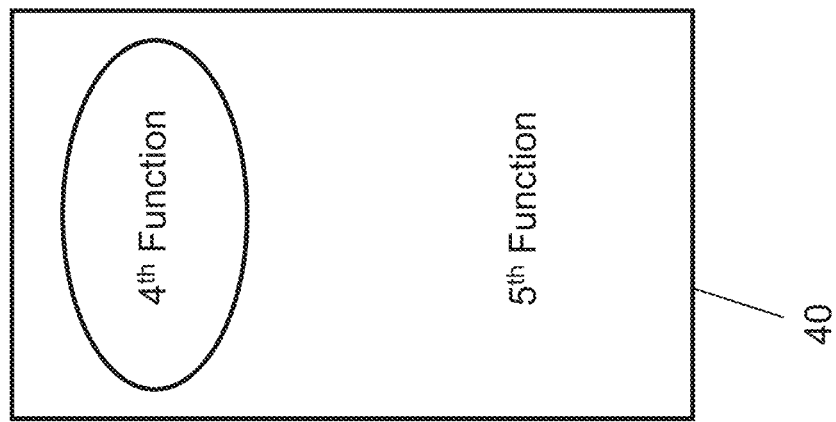
FIG. 22e: simultaneous employment of multiple display functions
Figure 22D:
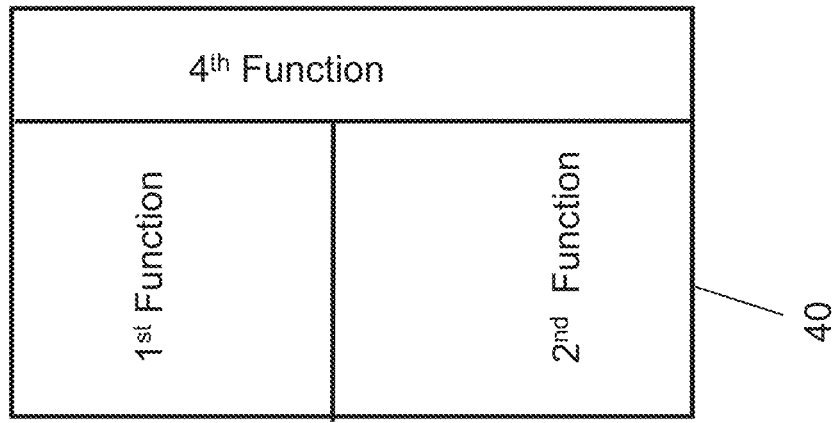
FIG. 22d: simultaneous employment of multiple display functions

The Controller 120, Function Selector 122 and Display Data 124 may be used to enable a display system 40 that simultaneously employs more than one of the said display functions in more than one spatial region of the display system 40. For example, FIG. 22a illustrates the employment of the $1^{st}$ display function in a first spatial region of the display system 40 and the employment of the $2^{nd}$ display function in a second spatial region. For example, FIG. 22b illustrates the employment of the $3^{rd}$ display function in a first spatial region of the display system 40 and the employment of the $2^{nd}$ display function in a second spatial region. For example, FIG. 22c illustrates the employment of the $3^{rd}$ display function in a first spatial region of the display system 40 and the employment of the $4^{th}$ display function in a second spatial region. For example, FIG. 22d illustrates the employment of the $1^{st}$ display function in a first spatial region of the display system 40 and the employment of the $2^{nd}$ display function in a second spatial region and the employment of the $4^{th}$ display function in a third spatial region. For example, FIG. 22e illustrates the employment of the $4^{th}$ display function in a first spatial region of the display system 40 and the employment of the $5^{th}$ display function in a second spatial region. For example, FIG. 22f illustrates the employment of the $1^{st}$ display function in a first spatial region of the display system 40 and the employment of the $5^{th}$ display function in a second spatial region and the employment of the $6^{th}$ display function in a third spatial region. The size and shape of a given spatial region and the associated display function 1 thru 6 of said spatial region may be configured by the user or by an application based selector (selected automatically by the particular application utilizing the display system 40).

As referenced above with respect to FIG. 4, the reflective polariser 30 may have specular reflection properties or diffuse reflection properties. The above embodiments generally incorporate a reflective polariser having specular reflective properties. The following embodiments incorporate a reflective polariser having diffuse reflective properties. In a first general embodiment, the reflective polariser 30 of FIG. 4 constitutes such diffuse reflective element.

Figure 25:
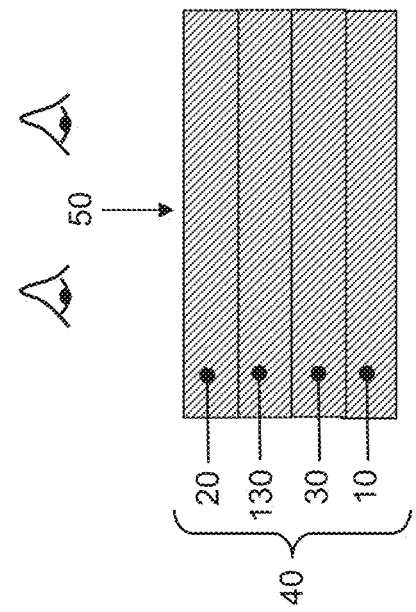
FIG. 25: Alternative Display System embodiment

In other embodiments a specularly reflective element may be provided in combination with a diffuse reflective element so as to provide a two-layer optical film having both specularly and diffuse reflective properties. FIG. 25 shows a variation of FIG. 4 above, but which incorporates such a two layer optical film. With reference to FIG. 25, the display system 40 is modified so as to include the first image display 10, a reflective polariser 30 with speculalry reflective properties (such as a Dual Brightness Enhancement Film (DBEF), an optical diffuser 130, and the second image display 20. The display system 40 may also comprise a touch-screen (not shown) for inputting information that may be intrinsic or extrinsic to either the first image display 10 and/or the second image display 20. The viewing side 50 of the display system 40 is also shown.

The reflective polariser 30 and optical diffuser 130 may be combined into a single optical film. In exemplary embodiments, the optical film is comprised of a specular reflective DBEF 30 and an adhesive layer that has an optical diffuser function to form the optical diffuser 130. The component that provides the optical diffuser function 130 may substantially maintain the polarisation state of light that passes through the optical diffuser 130. If the light emitted from the first image display 10 is polarised, then an optical diffuser that substantially maintains the degree of polarisation has the advantage that more light may be transmitted from the first image display 10 to the viewer. In other words, if the light emitted from the first image display is polarised, then a polarisation preserving diffuser improves the light efficiency of the display system by enabling more light from the first image display 10 to reach the viewer.

The optical diffuser 130 may be a polarisation sensitive optical diffuser and therefore diffuse light of a first polarisation state and not diffuse light of a second polarisation state. The first polarisation state and second polarisation state may be orthogonal to each other. The first polarisation state and second polarisation state may be linear polarisations. The second polarisation state may be substantially the same as the polarisation state emitted from the first image display 10. In other words, polarised light that is transmitted through the optical diffuser 130 that has originated from the first image display 10 is not diffused by the optical diffuser 60. The first polarisation state may be substantially the same as the polarisation state of ambient light that has been transmitted through the second image display 20. The second polarisation may be substantially the same as the polarisation state of ambient light that has been transmitted through the second image display 20 when the second image display is switched into the HAN state 25a. In other words, when the second image display 20 is in the HAN state 25a, ambient light that is transmitted through the second image display 20 is polarised such that it is diffused by the optical diffuser 130.

Figure 26:
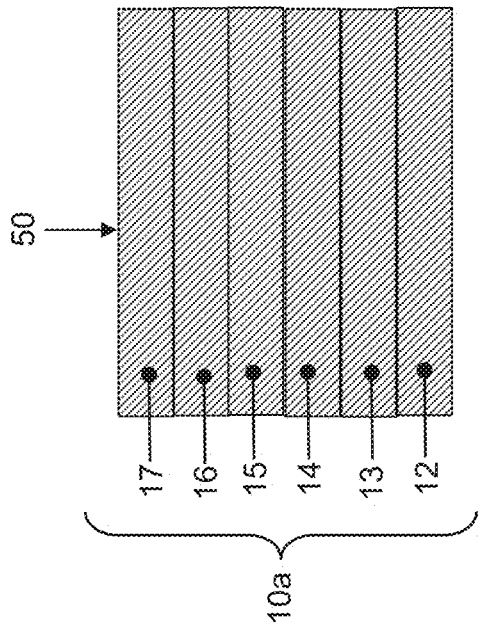
FIG. 26: Alternative embodiment of liquid crystal type first image display, side view

The first image display 10 may be a liquid crystal display (LCD) 10a as depicted in FIG. 26, or an organic light emitting display (OLED) 10b as depicted in FIGS. 27-29, or any other type of image display. First image display configurations 10a and 10b may bear similarity to the previously described first image display 10. The LCD 10a may be a transmissive LCD or reflective LCD or transflective LCD. The first image display 10a or 10b is pixelated and may be capable of displaying high resolution, full colour images. The first image display 10a or 10b may be a passively addressed display or may be an actively addressed display.

The second image display 20 may be a liquid crystal display. The second image display may be a Zenithal Bistable Liquid Crystal Display. The second image display does not contain opaque Thin Film Transistors (TFT), and an image may be displayed on the second image display via a passive addressing scheme (duty-type driving) or a further addressing scheme that does not employ the use of opaque transistors. The second image display 20 is chosen to minimise any Moiré artefacts that may occur between the first image display 10a or 10b and the second image display 20. The human eye is particularly sensitive to Moiré artefacts and therefore it may be difficult to completely suppress all Moiré artefacts between the first image display 10a or 10b and the second image display 20 if an optical diffuser 130 is not used. An unexpected and enhanced advantage is achieved over conventional configurations: the optical diffuser 130 can significantly reduce or eliminate Moiré artefacts while maintaining a high degree of image clarity from the first image display 10a or 10b. In other words, Moiré artefacts may be significantly reduced or eliminated without a significant reduction in the perceived resolution of the first image display 10a or 10b. This substantial advantage was achieved particularly well with a two layer optical film of reflective polariser 30 and optical diffuser 130.

With reference to FIG. 26, the first image display 10 may be a liquid crystal display 10a which includes a backlight 12, a first polariser 13, a first substrate 14, a liquid crystal layer 15, a second substrate 16 and a second polariser 17. The second polariser 17 is disposed on the viewing side 50 of the liquid crystal display 10a. The polarisers 13 and 17 may be linear polarisers or circular polarisers. Optical retardation films that improve the viewing angle performance and contrast ratio of the liquid crystal display 10a may be disposed between the first polariser 13 and the first substrate 14, and/or disposed between the second substrate 16 and the second polariser 17. For diagrammatic clarity, optical retardation films that improve the viewing angle performance and contrast ratio of the first image display LCD 10a have been omitted. The light exiting the polarising element on the viewing side 50 is linearly polarised with the transmission axis associated with the polarising element 17 and the transmission axis of the reflective polariser 30 aligned substantially parallel to each other.

With reference to FIG. 27, the first image display 10 may be an organic light emitting display (OLED) 10b which includes a first substrate 14, an organic electroluminescent layer 61 and a second substrate 16.

With reference to FIG. 28, the first image display 10 may be an organic light emitting display (OLED) 10b which includes a first substrate 14, an organic electroluminescent layer 61, second substrate 16 and a polarising element 17 disposed on the viewing side 50 of the OLED 10b. The polarising element 17 may be a linear polariser or a circular polariser. The advantage of the circular polariser is to prevent unwanted ambient light reflections from the electrodes within the OLED 10b and therefore improve the contrast ratio of the OLED 10b. The light exiting the polarising element on the viewing side 50 is linearly polarised with the transmission axis associated with the polarising element 17 and the transmission axis of the reflective polariser 30 aligned substantially parallel to each other.

With reference to FIG. 29, the first image display 10 may be an organic light emitting display (OLED) 10b which includes a first substrate 14, an organic electroluminescent layer 61, second substrate 16 and a quarter-wave retardation film 18 disposed on the viewing side 50 of the OLED 10b. The quarter-wave retardation film 18 is arranged so that linearly polarised light incident upon the quarter-wave retardation film 18 from the viewing side 50 creates circular polarised light. The optical axis of the quarter-wave retardation film is therefore arranged to be at substantially 45° to the linear polarisation state of the incident light from the viewing side 50. The advantage of the circular polarised light is to prevent unwanted ambient light reflections from the electrodes within the OLED 10b and therefore improve the contrast ratio of the OLED 10b.

With reference to FIG. 30, the second image display 20 may be a liquid crystal display which includes a first substrate 24, a liquid crystal layer 25, a second substrate 26 and a polariser 27. Optical retardation films that improve the viewing angle performance and contrast ratio of the second image display 20 may be disposed on the outer face of the first substrate 24 and/or disposed between the second substrate 26 and the polariser 27. For diagrammatic clarity, optical retardation films that improve the viewing angle performance and contrast ratio of the second image display 20 have been omitted. For diagrammatic clarity, the LC alignment layers, control electronics, and other components pertaining to the second image display 20 have also been omitted from FIG. 30. The second image display 20 is a liquid crystal display that in exemplary embodiments is a low power liquid crystal. display. As in previous embodiments, the second image display 20 may be a Zenithal Bistable Liquid Crystal Display (ZBD) 70 as is known in the art and described above in connection with the description of the prior at.

Figure 31:
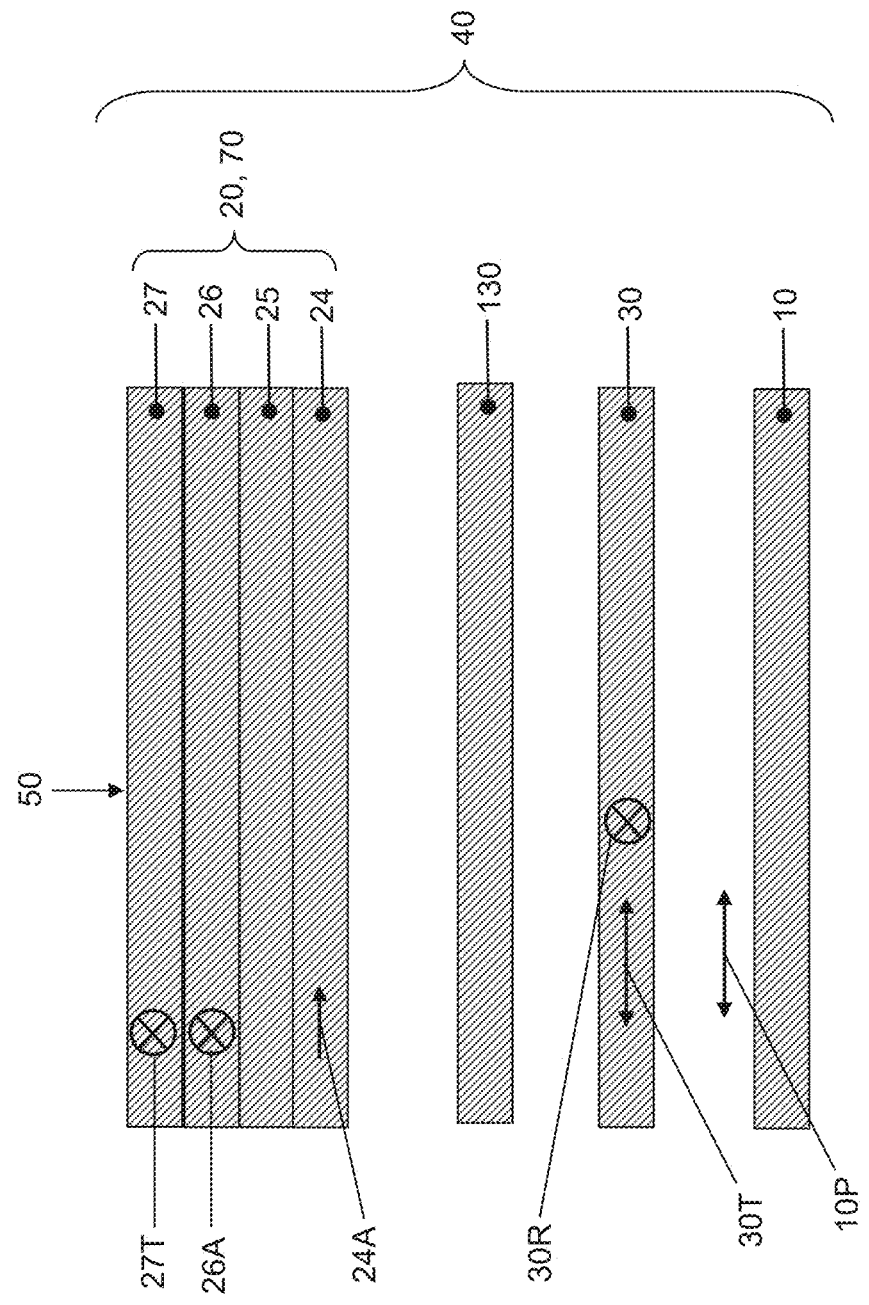
FIG. 31: Alternative embodiment of optical arrangement of a first image display and a second image display with an optical diffuser, exploded side view
Figure 32:
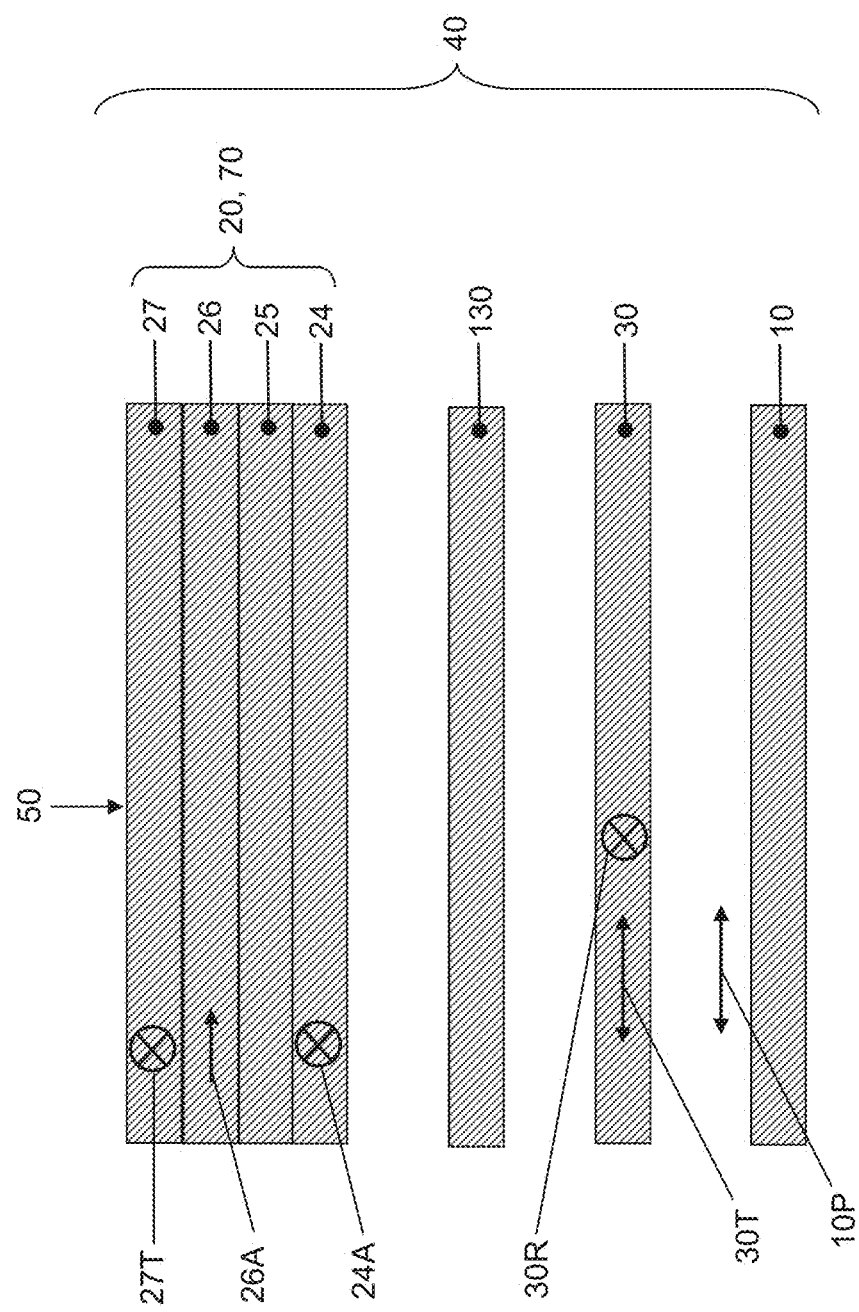
FIG. 32: Additional alternative embodiment of optical arrangement of a first image display and a second image display with an optical diffuser, exploded side view

With reference to FIG. 31 and FIG. 32 and, specific examples of the optical components required to realise the display system 40 are shown. FIGS. 31 and 32 bear similarity to FIGS. 16 and 17 described above, with the differences indicated below. In particular, the embodiments of FIGS. 31 and 32 include the optical diffuser 130, which is not present in previous embodiments. As above, FIG. 31 and FIG. 32 are exploded views of the display system 40 including the first image display 10, the reflective polariser 30, the optical diffuser 130 and the second image display 20. The components may be adhered together in optical contact with each other in order to form the display system 40. The display system 40 components in optical contact with each other has the advantage of minimising unwanted ambient reflections.

With reference to FIG. 31, the first image display 10 emits linearly polarised light 10P that is polarised parallel to the transmission axis 30T of the reflective polariser film 30. Perpendicular to the transmission axis 30T of the reflective polariser film 30 is the reflection axis 30R. Upon passing through the optical diffuser 130, the polarisation state of the light may be substantially maintained. An advantage of the optical diffuser 130 substantially maintaining the polarisation state is that more light from the first image display 10 is conveyed to the user. In other words, the first image display 10 appears brighter because absorption and/or reflection of the light from the first image display 10 by subsequent polarising elements is avoided. A further advantage of the optical diffuser 130 substantially maintaining the polarisation state is that ambient light transmitted through the second image display 20 may be more effectively prevented from exiting the display system 40, and thus provide a good quality dark state for images addressed to the second image display 20 (i.e. the second image display 20 may exhibit improved contrast between the black and white states). In other words, said further advantage of the optical diffuser 130 substantially maintaining the polarisation state is that light transmitted through the second image display 20 and transmitted through the reflective polariser 30 may be more effectively prevented from exiting the display system 40, and thus provide a good quality dark state for images addressed to the second image display 20 (i.e. the second image display 20 may exhibit improved contrast between the black and white states).

With reference to FIG. 31, the orientation of the linearly polarised light 10P may be intrinsic or extrinsic to the design of the first image display 10. A half-wave retarder (not shown) may be employed to rotate the linear polarisation state of light exiting the first image display 10 so that the light incident on the reflective polariser 30 from the first image display 10 is polarised parallel to the transmission axis 30T of the reflective polariser 30. The second image display 20 is Zenithal Bistable Liquid Crystal Display (ZBD) 70. With the ZBD 70 switched into the TN state 25b, the liquid crystal alignment direction 24A associated with lowermost substrate 24 is arranged parallel to the transmission direction 30T of the reflective polariser 30. In the TN state 25b, the liquid crystal alignment direction 26A associated with the uppermost substrate 26 is always arranged perpendicular to the alignment direction 24A. The transmission axis 27T of the polariser 27 is arranged perpendicular to the reflective polariser transmission axis 30T.

Alternatively, with reference to FIG. 32, with the ZBD 70 switched into the TN state 25b, the liquid crystal alignment direction 24A associated with the lowermost substrate 24 may be arranged perpendicular to the transmission direction 30T of the reflective polariser 30. In the TN state 25b, the liquid crystal alignment direction 26A associated with the uppermost substrate 26 is always arranged perpendicular to the alignment direction 24A. The transmission axis 27T of the polariser 27 is arranged perpendicular to the reflective polariser transmission axis 30T.

A first display function of the display system 40 enables the user to view the first image display 10 as if the second image display 20 was not there. The first display function is achieved with the ZBD 70 switched into the TN state 25b. Linearly polarised light emitted from the image display 10 is transmitted substantially unattenuated through the reflective polariser 30 and optical diffuser 130 and enters the ZBD 70. Upon exiting the ZBD the light is substantially linearly polarised and orientated substantially parallel to the transmission axis of the polarising element 27 i.e. the ZBD has sustainably rotated the axis of linear polarisation through 90°.

A second display function of the display system 40 is a diffuse reflective mode (not mirror-like) that can convey information to the user. The first image display is arranged to emit no light (i.e. the first image display is turned off or is in stand-by mode, or displays a black image or has the backlight 14 (if applicable) turned off). To reduce power consumption, it is preferable that the first image display 10 is turned off. The information is conveyed to the user by switching pixels of the ZBD 70 into either the HAN state 25a or the TN state 25b. With the ZBD 70 switched into the HAN state 25a, ambient light is substantially diffusely reflected from the display system 40. The optical diffusion occurs from the optical diffuser layer 130 and the reflection occurs from the reflective polariser 30. The combined function of the optical diffuser 130 and the reflective polariser 30 is to provide diffuse reflectivity. Ambient light undergoes substantially no polarisation change upon traversing the liquid crystal layer 25 of the ZBD 70 switched into the HAN state 25a. Ambient light undergoes substantially no polarisation change upon traversing the optical diffuser 130 if the optical diffuser 130 is a polarisation maintaining optical diffuser. Consequently, this ambient light is diffusely reflected when the ZBD 70 is switched into the HAN state 25*a* and is substantially transmitted through the polariser 27 to yield a diffusively reflective mode. With the ZBD 70 switched into the TN state 25*b*, ambient light is substantially transmitted through the reflective polariser 30 and is absorbed by the optical components of the first image display 10. Consequently, an image (and hence information) can be conveyed to the user via a combination of diffusely reflective pixels and non-reflective black pixels. An advantage of the diffusely reflective (not mirror-like) pixels over specular reflective (mirror-like) pixels is that an image comprised of diffusively reflective pixels is easier to discern from a larger range of viewing angles. In other words, a display system 40 with a reflective mode has a wider viewing angle if the reflective mode is a diffusely reflective (not mirror like)

A third display function of the display system 40 can convey information to the user in an eye-catching and attractive fashion by addressing images to both the first image display 10 and the second image display 20. As described previously, with the ZBD 70 switched into the HAN state 25*a*, ambient light is substantially reflected from the display system 40. With the ZBD 70 switched into the TN state 25*b*, ambient light is substantially transmitted through the reflective polariser 30 and is absorbed by the optical components of the first image display 10. As previously described, the user can view the first image display 10 as if the second image display 20 was not there (i.e. the ZBD 70 appears substantially transparent) when the ZBD 70 is switched into the TN state 25*b*. With the ZBD 70 switched into the TN state 25*b*, the pixels of the first image display 10 are clearly revealed to the user. With the ZBD 70 switched into the HAN state 25*a*, a small proportion of light from the first image display 10 may be transmitted through the second display 20 to be observed by the user. These effects may be used to add to the attractiveness of the display mode. With the ZBD 70 switched into the TN state 25*b*, the proportion of light transmitted through the second display 20 from the first image display 10 and the proportion of light reflected from the reflective polariser 30 may adjusted via application of a voltage across the TN state 25*b*. This effect may also be used to add to the attractiveness of the display mode. Consequently, information can be conveyed to the user via a combination of reflective pixels (from ZBD 70) and pixels from the first image display. The reflective pixels from the second image display 20 and the pixels from the first image display may be laterally separated and/or laterally coincident (i.e. the viewer may perceive the reflective pixels from the second image display 20 and the pixels from the first image display 10 to emanate from different spatial locations from the display system 40 and/or the viewer may perceive the reflective pixels from the second image display 20 and the pixels from the first image display 10 to emanate from the same spatial location from the display system 40)

A fourth display function of the display system 40 enables the user to view autostereoscopic 3D images. Interlaced 3D images may be addressed to the first image display 10 in a standard fashion while the second image display 20 directs the stereoscopic images to the corresponding eyes of the user. Alternatively, 3D images may be addressed to the second image display 20 in a standard fashion while the first image display 10 directs the stereoscopic images to the corresponding eyes of the user. For the first image display 10 or second image display 20 to direct stereoscopic images to the corresponding eye, the first image display 10 or second image display 20 must perform an imaging function. The imagining function of the first image display 10 or the imaging function of the second image display 20 may be performed by an array of parallax barriers. The parallax barrier array is formed in either the first image display or the second image display by addressing some pixels with a black image and other pixels with a white image to create a periodic array of non-transmissive portions (black pixels) and transmissive portions (white pixels). The imagining function of the first image display 10 or the second image display 20 may be performed by an array of liquid crystal lenses. The imagining function of the first image display 10 and the second image display 20 may be performed by an array of liquid crystal lenses where each lens adjoins a parallax barrier element.

According to an aspect, a display system is provided which includes a first image display; a second image display; a reflective polariser disposed between the first image display and the second image display, with the second image display disposed on a viewing side of the display system; and a controller for addressing image data to the first image display and the second image display, wherein the controller, the first image display and second image display are configured to selectively operate in accordance with: a first display function in which the first image display is visible to a viewer through the second image display and the second image display appears substantially transparent to the first image display; a second display function in which the display system appears as a plane mirror to the viewer; and a third display function in which the display system appears as a patterned mirror to the viewer.

According to another aspect, the controller, the first image display and the second image display are further configured to selectively operate in accordance with a fourth display function in which an image data from the first display is visible to a viewer through the second image display and a patterned mirror is visible to the viewer from the second image display.

According to another aspect, the controller, the first image display and the second image display are further configured to selectively operate in accordance with a fifth display function in which the second image display functions as a switchable parallax optic to present autostereoscopic viewing to the viewer of three dimensional data presented by the first image display.

In accordance with another aspect, the second image display is a Zenithal Bistable Liquid Crystal Display (ZBD), which may also be known as a Zenithal Bistable Nematic (ZBN)

According to still another aspect, the controller, the first image display and the second image display are further configured to selectively operate in accordance with a sixth display function in which the second image display functions as a switchable obscuring optic in order that the image presented by the first image display is substantially viewable on-axis of the display system but is substantially obscured from view off-axis.

According to another aspect, the controller addresses the ZBD to switch pixels between first and second stable states.

In accordance with yet another aspect, a pixel in the first stable state is substantially transparent to the first image display, and in a second stable state is reflective to the viewer.

According to another aspect, the second image display is a Super Twisted Nematic Liquid Crystal Display (STN).

In still another aspect, the second image display is a Bistable Twisted Nematic Liquid Crystal Display (BTN).

According to another aspect, the second image display is a Ferroelectric Liquid Crystal Display (FLC).

With still another aspect, the reflective polariser has specular reflection properties.

According to another aspect, the reflective polariser is a Dual Brightness Enhancement Film (DBEF).

According to another aspect, a retardation film is disposed between an uppermost substrate of the first image display and the reflective polariser.

In yet another aspect, a retardation film is disposed between the reflective polariser and a lowermost substrate of the second image display.

According to another aspect, the retardation film is a quarter waveplate.

In yet another aspect, the retardation film is a half waveplate.

According to another aspect, a polariser is positioned between an uppermost substrate of the first image display and the reflective polariser.

In still another aspect, an addressing scheme of the second image display does not utilize opaque transistors.

In accordance with another aspect, a backlight for providing backlight to the first image display, and the controller being configured to turn the backlight on or off as a function of the particular display function.

In still another aspect, the controller, the first image display and the second image display are configured to operate in accordance with two or more of the display functions simultaneously in different corresponding spatial regions.

Another aspect of the invention is a display system. In exemplary embodiments, the display system includes a first image display, a second image display, a diffusively reflective element disposed between the first image display and the second image display, with the second image display disposed on a viewing side of the display system, and a controller for addressing image data to the first image display and the second image display. The controller, the first image display and second image display are configured to selectively operate in accordance with: a first display function in which the first image display is visible to a viewer through the second image display and the second image display appears substantially transparent to the first image display; and a second display function in which the display system operates in a reflective mode such that the display system appears as a patterned diffuse reflection to the viewer.

In an exemplary embodiment of the display system, the diffusively reflective element is an optical diffuser.

In an exemplary embodiment of the display system, the controller, the first image display and second image display are configured to selectively operate in accordance with a third display function in which images are addressed to both the first image display and the second image display.

In an exemplary embodiment of the display system, the first image display and second image display are configured to selectively operate in accordance with a fourth display function that enables the user to view autostereoscopic 3D images.

In an exemplary embodiment of the display system, the display system includes a first image display, a second image display, a reflective polariser disposed between the first image display and the second image display, with the second image display disposed on a viewing side of the display system, and a controller for addressing image data to the first image display and the second image display. The controller, the first image display and the second image display are configured to selectively operate in accordance with: a first display function in which the first image display is visible to a viewer through the second image display and the second image display appears substantially transparent to the first image display; and a second display function in which the display system appears as a patterned diffuse reflection to the viewer.

In an exemplary embodiment of the display system, the controller, the first image display and the second image display are further configured to selectively operate in accordance with a third display function in which the second image display functions as a switchable parallax optic to present autostereoscopic viewing to the viewer of three dimensional data presented by the first image display.

In an exemplary embodiment of the display system, the controller, the first image display and the second image display are further configured to selectively operate in accordance with a fourth display function in which the second image display functions as a switchable obscuring optic in order that the image presented by the first image display is substantially viewable on-axis of the display system but is substantially obscured from view off-axis.

In an exemplary embodiment of the display system, the second image display is a Zenithal Bistable Liquid Crystal Display (ZBD).

In an exemplary embodiment of the display system, the controller addresses the ZBD to switch pixels between first and second stable states.

In an exemplary embodiment of the display system, a pixel in the first stable state is substantially transparent to the first image display, and in a second stable state is reflective to the viewer.

In an exemplary embodiment of the display system, the second image display is a Super Twisted Nematic Liquid Crystal Display (STN).

In an exemplary embodiment of the display system, the second image display is a Bistable Twisted Nematic Liquid Crystal Display (BTN).

In an exemplary embodiment of the display system, the second image display is a Ferroelectric Liquid Crystal Display (FLC).

In an exemplary embodiment of the display system, a retardation film is disposed between an uppermost substrate of the first image display and the reflective polariser.

In an exemplary embodiment of the display system, a retardation film is disposed between the reflective polariser and a lowermost substrate of the second image display.

In an exemplary embodiment of the display system, the retardation film is a quarter waveplate.

In an exemplary embodiment of the display system, the retardation film is a half waveplate.

In an exemplary embodiment of the display system, an addressing scheme of the second image display does not utilize opaque transistors.

In an exemplary embodiment of the display system, the reflective polariser comprises an optical diffuser.

In an exemplary embodiment of the display system, the display system include a first image display, a second image display, a reflective polariser disposed between the first image display and the second image display, with the second image display disposed on a viewing side of the display system, and an optical diffuser layer disposed between the second image display and reflective polariser.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

A display system that is suitable for mobile phones, handheld games consoles, portable PCs and televisions.

The invention claimed is:

1. A display system, comprising:
   a first pixelated image display;
   a second pixelated image display;
   a reflective polariser disposed between the first image display and the second image display, with the second image display disposed on a viewing side of the display system;
   an optical diffuser that maintains the polarisation state of light disposed between the reflective polariser and the second image display; and
   a controller for addressing image data to the first image display and the second image display, wherein the controller, the first image display and the second image display are configured to selectively operate in accordance with:
   a first display function in which the first image display is visible to a viewer through the second image display by the controller controlling the second image display to be substantially transparent to light emitted by the first image display; and
   a second display function in which the display system appears as a patterned diffuse reflection to the viewer by the controller controlling the first image display to emit no light and switching pixels in the second image display to have a pattern that conveys information; and
   wherein:
   the first image display, second image display, reflective polariser and optical diffuser are adhered together in optical contact with each other;
   the second image display has a liquid crystal layer, a first substrate disposed on a non-viewing side relative to the liquid crystal layer, and a second substrate disposed on the viewing side relative to the liquid crystal layer;
   the second image display is a Zenithal Bistable Liquid Crystal Display (ZBD) that is switchable by the controller between a twisted nematic (TN) configuration of liquid crystal molecules and a hybrid aligned nematic (HAN) configuration of liquid crystal molecules;
   the first image display emits light linearly polarised in a first direction, and a transmission axis of the reflective polariser is arranged in the first direction;
   for the first display function, the controller switches the ZBD into the TN configuration and the alignment direction of the liquid crystal molecules of the first substrate is in the first direction, and the alignment direction of the liquid crystal molecules of the second substrate is in a second direction perpendicular to the first direction; and
   a polariser that has a transmission axis in the second direction is disposed on the viewing side of the second image display.

2. The display system according to claim 1, wherein the controller, the first image display and the second image display are further configured to selectively operate in accordance with a third display function in which the second image display functions as a switchable parallax optic to present autostereoscopic viewing to the viewer of three dimensional data presented by the first image display.

3. The display system according to claim 2, wherein the controller, the first image display and the second image display are further configured to selectively operate in accordance with a fourth display function in which the second image display functions as a switchable obscuring optic in order that the image presented by the first image display is substantially viewable on-axis of the display system but is substantially obscured from view off-axis.

4. The display system of claim 3, wherein the controller, the first image display and second image display are configured to selectively operate in accordance with a fifth display function in which images are addressed to both the first image display and the second image display.

5. The display system according to claim 1, wherein the controller addresses the ZBD to switch pixels between first and second stable states.

6. The display system according to claim 5, wherein a pixel in the first stable state is substantially transparent to the first image display, and in a second stable state is reflective to the viewer.

7. The display system according to claim 1, wherein a retardation film is disposed between an uppermost substrate of the first image display and the reflective polariser.

8. The display system according to claim 7, wherein the retardation film is a quarter waveplate.

9. The display system according to claim 7, wherein the retardation film is a half waveplate.

10. The display system according to claim 1, wherein a retardation film is disposed between the reflective polariser and a lowermost substrate of the second image display.

11. The display system according to claim 1, wherein an addressing scheme of the second image display does not utilize opaque transistors.

12. The display system of claim 1, wherein the optical diffuser comprises a polarization sensitive optical diffuser that diffuses light of a first polarization state and does not diffuse light of a second polarization state.

13. The display system according to claim 1, wherein for the second display function the controller switches at least a portion of the pixels of the ZBD into the HAN configuration.

14. A display system, comprising:
   a first pixelated image display;
   a second pixelated image display;
   a reflective polariser disposed between the first image display and the second image display, with the second image display disposed on a viewing side of the display system;
   an optical diffuser that maintains the polarisation state of light disposed between the reflective polariser and the second image display; and
   a controller for addressing image data to the first image display and the second image display, wherein the controller, the first image display and the second image display are configured to selectively operate in accordance with:
a first display function in which the first image display is visible to a viewer through the second image display by the controller controlling the second image display to be substantially transparent to light emitted by the first image display; and
a second display function in which the display system appears as a patterned diffuse reflection to the viewer by the controller controlling the first image display to emit no light and switching pixels in the second image display to have a pattern that conveys information; and wherein:
the first image display, second image display, reflective polariser and optical diffuser are adhered together in optical contact with each other;
the second image display has a liquid crystal layer, a first substrate disposed on a non-viewing side relative to the liquid crystal layer, and a second substrate disposed on the viewing side relative to the liquid crystal layer;
the second image display is a Zenithal Bistable Liquid Crystal Display (ZBD) that is switchable by the controller between a twisted nematic (TN) configuration of liquid crystal molecules and a hybrid aligned nematic (HAN) configuration of liquid crystal molecules;
the first image display emits light linearly polarised in a first direction, and a transmission axis of the reflective polariser is arranged in the first direction;
for the first display function, the controller switches the ZBD into the TN configuration and the alignment direction of the liquid crystal molecules of the first substrate is in a second direction perpendicular to the first direction, and the alignment direction of the LC molecules of the second substrate is in the first direction; and
a polariser that has a transmission axis in the second direction is disposed on the viewing side of the second image display.

15. The display system of claim 14, wherein the controller, the first image display and second image display are further configured to selectively operate in accordance with a third display function in which images are addressed to both the first image display and the second image display.

16. The display system according to claim 14, wherein the controller, the first image display and the second image display are further configured to selectively operate in accordance with a fourth display function in which the second image display functions as a switchable parallax optic to present autostereoscopic viewing to the viewer of three dimensional data presented by the first image display.

17. The display system according to claim 14, wherein the controller, the first image display and the second image display are further configured to selectively operate in accordance with a further display function in which the second image display functions as a switchable obscuring optic in order that the image presented by the first image display is substantially viewable on-axis of the display system but is substantially obscured from view off-axis.

18. The display system according to claim 14, wherein the controller addresses the ZBD to switch pixels between first and second stable states.

19. The display system according to claim 14, wherein a pixel in the first stable state is substantially transparent to the first image display, and in a second stable state is reflective to the viewer.

20. The display system according to claim 14, wherein for the second display function the controller switches at least a portion of the pixels of the ZBD into the HAN configuration.

* * * * *